United States Patent
Childress et al.

(10) Patent No.: US 7,230,805 B2
(45) Date of Patent: Jun. 12, 2007

(54) SEMICONDUCTOR SLIDER WITH AN INTEGRAL SPIN VALVE TRANSISTOR STRUCTURE AND METHOD FOR MAKING SAME WITHOUT A BONDING STEP

(75) Inventors: Jeffrey Robinson Childress, San Jose, CA (US); Robert Edward Fontana, Jr., San Jose, CA (US); Jeffrey S. Lille, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 11/036,238

(22) Filed: Jan. 13, 2005

(65) Prior Publication Data

US 2005/0122634 A1    Jun. 9, 2005

Related U.S. Application Data

(62) Division of application No. 10/150,189, filed on May 16, 2002, now Pat. No. 6,870,717.

(51) Int. Cl.
*G11B 5/39* (2006.01)
*H01L 43/00* (2006.01)

(52) U.S. Cl. ............... 360/324.2; 360/324; 360/235.1; 257/421; 257/423

(58) Field of Classification Search ............. 360/324.1, 360/324.2, 324.12, 324, 235.1, 235.3; 257/9, 257/29, 37, 421, 423, 427
See application file for complete search history.

(56) References Cited

U.S. PATENT DOCUMENTS 4,310,798 A    1/1982    Brunsch et al. ............. 324/209

(Continued)

FOREIGN PATENT DOCUMENTS

| JP | 60000616 | 1/1985 |
|---|---|---|
| JP | 63155420 | 6/1988 |
| JP | 2199609 A | 8/1990 |
| JP | 2000207720 A | 7/2000 |
| JP | 2000311324 A | 11/2000 |

OTHER PUBLICATIONS

*IBM Technical Disclosure Bulletin*, vol. 23, No. 12, May 1981, "Magnetic Head Arm Assembly".

(Continued)

*Primary Examiner*—William J Klimowicz
(74) *Attorney, Agent, or Firm*—Matthew S. Zises; Lewis L. Nunnelley

(57) ABSTRACT

A semiconductor slider including an integral spin valve transistor (SVT) having a read width of 250 nm or less disposed on a monolithic semiconductor. substrate, useful in magnetic data storage applications. The monolithic slider may also include other magnetic and semiconductor transistor structures and is fabricated in a single process using standard thin-film processing steps. The SVT includes a sensor stack having a top surface and including a first ferromagnetic (FM) layer in contact with and forming a Schottky barrier at the monolithic semiconductor substrate, a FM shield layer disposed over the sensor stack and in electrical contact with the top surface thereof, a SVT emitter terminal coupled to the FM shield, a SVT collector terminal coupled to the substrate and a SVT base terminal coupled to the first FM layer. The sensor stack may include a spin valve (SV) stack or a tunnel valve (TV) stack, for example.

43 Claims, 13 Drawing Sheets

U.S. PATENT DOCUMENTS

| | | | | |
|---|---|---|---|---|
| 4,809,103 | A | | 2/1989 | Lazzari ................. 360/103 |
| 5,587,857 | A | | 12/1996 | Voldman et al. ............ 360/103 |
| 5,654,566 | A | | 8/1997 | Johnson ................. 257/295 |
| 5,712,747 | A | | 1/1998 | Voldman et al. ............ 360/103 |
| 5,747,859 | A | * | 5/1998 | Mizushima et al. ........ 257/421 |
| 5,771,571 | A | | 6/1998 | Voldman et al. ......... 29/603.12 |
| 5,805,382 | A | | 9/1998 | Lee et al. ................. 360/104 |
| 5,973,334 | A | * | 10/1999 | Mizushima et al. .......... 257/25 |
| 6,084,746 | A | | 7/2000 | Shiraishi et al. ............ 360/104 |
| 6,218,718 | B1 | | 4/2001 | Gregg et al. ................ 257/421 |
| 6,480,365 | B1 | * | 11/2002 | Gill et al. ............... 360/324.11 |
| 6,577,476 | B1 | * | 6/2003 | Childress et al. ...... 360/324.11 |
| 6,870,717 | B2 | * | 3/2005 | Childress et al. ........ 360/324.2 |
| 2006/0056113 | A1 | * | 3/2006 | Fukushima et al. ...... 360/324.1 |

OTHER PUBLICATIONS

*IBM Technical Disclosure Bulletin*, vol. 22, No. 1, Jun. 1979, "Magnetic Head Assembly . . . ".

*IBM Technical Disclosure Bulletin*, Jul. 1988, p. 59-60, "Device to Measure Magnetostriction . . . ".

*IEEE Transactions on Magnetics*, vol. 25, No. 3, May 1989, "A New High-Precision Optical . . . ".

*IEEE Transactions on Magnetics*, vol. 25, No. 5, Sep. 1989, "Measurement of Thin Film's . . . ".

*IEEE Transactions on Magnetics*, vol. 31, No. 6, Nov. 1993, "Measurement of Very Low . . . ".

*IEEE Transactions on Magnetics*, vol. 29, No. 6, Nov. 1993, "Magneostriction Measurement . . . ".

*IEEE Transactions on Magnetics*, vol. 32, No. 5, Sep. 1996, "Spin-Valve Effects in . . . ".

*IEEE Transactions on Magnetics*, vol. 33, No. 5, Sep. 1997, "Development of the Spin-."

*J. Phys D. Appl. Phys.*, No. 33, 2000, p. 2911-2920, "The spin-valve transistor".

*Physical Review Letters*, vol. 74, No. 26, Jun. 26, 1995, Perpendicular Hot Electron Spin-, no date.

*Science*, vol. 260, Apr. 16, 1993, "Bipolar Spin Switch".

* cited by examiner

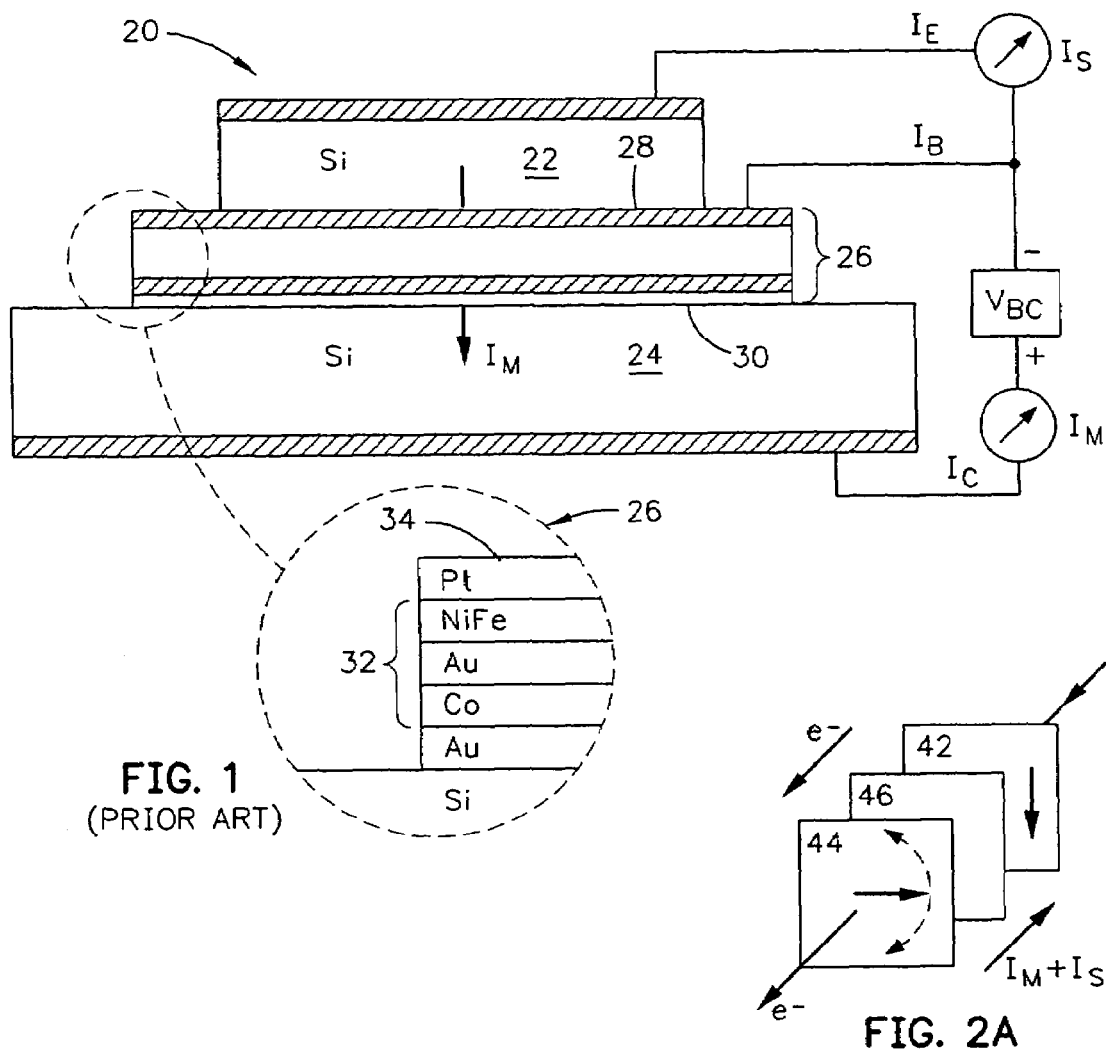
FIG. 1 (PRIOR ART)
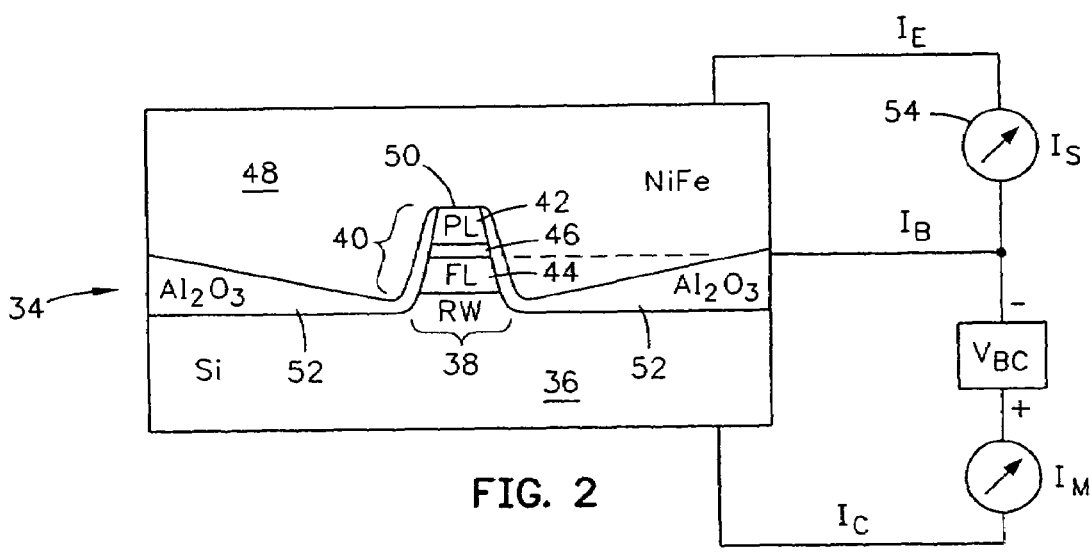
FIG. 2A
FIG. 2

SEMICONDUCTOR SLIDER WITH AN INTEGRAL SPIN VALVE TRANSISTOR STRUCTURE AND METHOD FOR MAKING SAME WITHOUT A BONDING STEP

REFERENCE TO RELATED APPLICATION

This is a divisional of application Ser. No. 10/150,189 filed May 16, 2002, now U.S. Pat. No. 6,870,717.

BACKGROUND OF THE INVENTION

1. Field of the Invention

This invention relates generally to spin valve transistor structures for magnetic read heads and more particularly to an integral spin valve transistor (SVT) structure formed in a semiconductor slider without the usual SVT wafer bonding step.

2. Description of the Related Art

Magneto-electronic devices with improved magnetic sensitivity are vital to increasing magnetic data storage densities. Giant magnetoresistance (GMR) sensors using only two layers of ferromagnetic (FM) material, the free (sensing) layer and the pinned (reference) layer, separated by a layer of non-magnetic conductive material (e.g., copper) are generally referred to as spin valve (SV) sensors and represent a major improvement that relies on the spin-dependent scattering effect. In SV sensors, the resistance of a spin valve (SV) to a sense current varies as a function of the spin-dependent transmission of the conduction electrons between two magnetic layers separated by a nonmagnetic spacer layer and the accompanying spin-dependent scattering that occurs at the interface of the magnetic and non-magnetic layers and within the magnetic layers. The SV stack may operate with sense current-in-the-plane (CIP) of the layers or with sense current-perpendicular-to-plane (CPP) of the layers.

Later, a new class of MR sensors, herein denominated tunnel-valve (TV) sensors, was discovered in which the nonmagnetic layer separating the two FM layers is made with an ultrathin nonconductive material, such as an aluminum oxide layer <20 Å thick. A distinctive feature of the TV sensor is its high impedance ($>10$ $\Sigma$–:$m^2$), which allows for large signal outputs. A TV stack has two FM layers separated by a thin insulating tunnel barrier layer whose operation relies on the spin-polarized electron tunneling phenomenon known in the art. For low applied fields (<100 Oe), the pinned (reference) layer is essentially fixed in one direction because of, for example, a higher coercivity, than the free (sensing) layer, which is essentially free to rotate in response to external fields. The insulating tunnel barrier layer is thin enough so that quantum mechanical tunneling occurs between the two FM layers. The tunneling phenomenon is electron-spin dependent, making the magnetic response of the TV a function of the relative moment orientations and spin polarizations of the two FM layers. The TV stack operates with sense current-perpendicular-to-plane (CPP) of the layers.

Meanwhile, the functional integration of the semiconductor and the ferromagnet resulted in a new magneto-electronic device denoted the spin valve transistor (SVT). The SVT is a three-terminal device, analogous to a metal-base transistor, where the charge carrier populations are distinguished by spin (magnetic moment) instead of electrical charge. The metal SVT base, which includes a spin-selective element such as the CPP SV stack, is sandwiched between two N-type silicon layers, for example. Hot electrons are injected over a Schottky barrier from the SVT emitter into the SV stack. Those spin-oriented electrons that are not spin-scattered continue through the SV stack and traverse a second Schottky barrier at the SVT collector, forming the magnetocurrent, which is extremely sensitive to the spin-scattering in the SVT. The emitter and collector junction materials are usually selected to provide a higher Schottky barrier at the emitter junction (e.g., silicon-platinum) than at the collector junction (e.g., silicon-gold). Until recently, successful fabrication of such metal-silicon SVT junctions required growing the metal layers directly on the crystalline semiconductor surface because any oxide contamination at the junction suppresses the tunneling of spin-oriented electrons into the conduction band of the semiconductor, and inhibits interdiffusion. This means that two semiconductor wafers must be bonded face-to-face at some point during fabrication to complete the SVT stack. Spin-scattering of hot electrons is determined by the magnetic state of the SV stack, which is sensitive to the intensity and orientation of an external magnetic field. Thus, a SVT may be employed as a read sensor for magnetic data storage systems because of the resulting magnetocurrent sensitivity to external magnetic fields, which provides a relative magnetic response of over 300% at room temperature with small fields.

The first SVT was reported by Mark Johnson ("Bipolar Spin Switch," *Science*, Vol. 260, pp. 320–323, Apr. 16, 1993), who describes a basic device with no power gain and nanovolt signal levels. Johnson later describes a spin-injected field-effect transistor (FET) in U.S. Pat. No. 5,654,566. Subsequently, Monsma et al. ("Perpendicular Hot Electron Spin-Valve Effect in a New Magnetic Field Sensor: The Spin-Valve Transistor," *Phys. Rev. Lett.* Vol. 74, No. 26, pp. 5260–3, Jun. 26, 1995) describe the current-perpendicular-to-plane (CPP) SVT design now well-known in the art. Monsma et al. emphasize the importance of direct silicon-metal interfaces at the emitter and collector junctions, and propose a detailed method for direct semiconductor bonding through spontaneous adhesion of a gold bonding layer to join two silicon-metal Schottky junctions into a single SVT stack.

Later, Kumar et al. ("The Spin-Valve Transistor," *J. Phys. D:Appl. Phys.*, Vol. 33, pp. 2911–20, November 2000) assert that it is essential to grow the metal layers directly on a crystalline silicon layer. They propose a vacuum metal-bonding method requiring clean room robots and a noble-metal bonding layer to join two processed wafers face-to-face during their SVT fabrication procedure. FIG. 1 shows the typical spin-valve transistor (SVT) embodiment 20 described by Kumar et al. A forward-biased emitter 22 having an emitter current $I_E$ and a reverse-biased collector 24 having a collector current $I_C$ each form a Schottky barrier with the base layer 26, which has a base current $I_B$. The Si—Pt Schottky barrier 28 and the Si—Au Schottky barrier 30 are formed at emitter 22 and collector 24, respectively. Base layer 26, shown in detail, includes a NiFe/Au/Co SV stack 32. SVT 20 is fabricated by first building up all of the elements in base layer 26 on crystalline collector layer 24, using conventional thin-film techniques. Then a second crystalline silicon emitter layer 22 is bonded to base layer 26 at junction 28 using a sophisticated vacuum metal-bonding method. Once this surface bonding effort forms the platinum-to-platinum bonding layer 34, additional conventional thin-film fabrication steps may be employed to etch and mill emitter layer 22 to form a plurality of SVT structures exemplified by SVT 20. In FIG. 1, the magnetocurrent $I_M$ is shown passing through from emitter to collector and a current monitor in the emitter-base circuit measures a related sense current $I_S$.

Other practitioners have proposed SVT fabrication methods that do not require a spontaneous adhesion bonding step. For example, in U.S. Pat. No. 5,973,334, Mizushima et al. employ a buffered nonmagnetic metal layer (e.g., aluminum) at the emitter to inject hot electrons into the SV stack (base) instead of using a Schottky barrier. This means that a single Schottky junction at the SVT collector is sufficient for SVT operation and no bonding step is needed to bond to an emitter Schottky junction for their SVT. In U.S. Pat. No. 6,218,718 B1, Gregg et al. describe a SVT wherein the pinned layer structure of the SV stack is separated by a silicon PN junction from a cobalt-oxide layer. Although Gregg et al. teach using a silver layer for the direct adhesion bonding step necessary for fabrication of one embodiment of their SVT design, they also suggest depositing a polysilicon layer at the collector to create an ohmic junction instead of a second Schottky junction. In this case, a single Schottky junction at the emitter is sufficient for SVT operation, and no bonding step is needed to bond to a collector Schottky junction for their SVT.

Clearly, the SVT is very useful as a read sensor for magnetic data storage systems because of its unusual sensitivity to external magnetic fields at room temperature and its small read width (RW) dimension. The SVT may be used as a read sensor in a magnetic read/write head for transferring data between a control circuit and a moving magnetic storage medium, such as a rotating magnetic disk or a streaming magnetic tape. Such a magnetic head is usually mounted on a slider at an air bearing surface (ABS) disposed at the moving surface of the magnetic medium. As is well-known, the slider is a key factor in determining the efficiency, density, speed, and accuracy with which data can be transferred and stored in a magnetic recording media in a data storage drive. The slider's size is an important performance factor; smaller sliders can effectively increase the recording medium's storage capacity by storing data more compactly on the recording medium. Functional integration is also an important performance factor. The typical slider merely includes a magnetic head to write and read binary data at a magnetic recording medium. However, some practitioners describe advanced slider designs that incorporate other circuitry to perform additional functions close to the read/write elements.

For example, in U.S. Pat. No. 4,809,103, Lazzari describes a silicon wafer having a magnetic head and an electronic circuit integrated to the head. As another example, Beck et al. (J. W. Beck & B. Brezoczky, "Magnetic Head Assembly Including Head Circuitry," *IBM Technical Disclosure Bulletin*, Vol. 22, No. 1, June 1979.) refer to a magnetic head assembly with input and output signal-processing circuitry incorporated in a chip fixed to an air bearing slider. The circuitry of Beck et al. appears to include read signal preamplifier and write signal output electronics. In addition to the improvement of signal-to-noise ratios for sensor signals, another benefit of disposing support circuitry aboard a slider is compactness. In modern data storage drives, element size is critical, especially in particularly compact applications such as data storage drives for laptop computers.

There is a clearly-felt need in the art for a monolithic slider that integrates a read/write head with an integral SVT and other signal-processing functions in a single element that may be fabricated using only those thin-film fabrication methods that are well-understood and widely-appreciated in the art. Until now, there was no method known in the art for fabricating a slider incorporating an integral SVT and other electronic components in a conventional thin-film process. The related unresolved problems and deficiencies are clearly felt in the art and are solved by this invention in the manner described below.

SUMMARY OF THE INVENTION

This invention solves the above-described problems by introducing a fabrication technique for forming a spin valve transistor (SVT) structure in a semiconductor slider without a non-standard wafer bonding step. This semiconductor slider includes an integral SVT having a read width (RW) of 250 nm or less disposed on a monolithic semiconductor substrate, such as silicon, for example. The method of this invention also permits fabrication of other integrated read/write head elements and other semiconductor transistor structures during the same process on the same substrate using standard thin-film processing steps, thereby providing for the incorporation of other small-signal processing electronics with the integrated read/write head in the same semiconductor slider.

The slider-integral SVT of this invention includes a sensor stack having a top surface and including a first ferromagnetic (FM) layer in contact with and forming a Schottky barrier at the monolithic semiconductor substrate, a FM shield layer disposed over the sensor stack and in electrical contact with the top surface thereof, a SVT emitter terminal coupled to the FM shield, a SVT collector terminal coupled to the substrate and a SVT base terminal coupled to the first FM layer. The sensor stack may include a spin valve (SV) stack or a tunnel valve (TV) stack, for example, and the sensor stack may be disposed with a FM pinned layer structure at the top surface and the FM free layer in contact with and forming a Schottky barrier at the monolithic semiconductor substrate, or inverted with a FM free layer at the top surface and the FM pinned layer structure in contact with and forming a Schottky barrier at the monolithic semiconductor substrate. The integral SVT configuration of this invention exploits the unexpectedly advantageous observation that the emitter Schottky barrier may be replaced with a FM emitter layer that also provides shielding and emitter current conductivity. It is a purpose of this invention to provide a SVT slider fabrication technique using standard thin-film processing steps, which do not include the semiconductor vacuum-bonding step normally required in the art. It is an advantage of the SVT slider of this invention that a single Schottky barrier is sufficient to reduce the barrier height and increase the hot electron injection levels in the substrate beyond those known in the SVT art, thereby improving SVT sensitivity to external magnetic fields. The fabrication method of this invention employs materials that can withstand processing temperatures up to 200° C. to permit proper annealing of magnetic layers. The SVT portion of the slider of this invention may be fabricated with an overall thickness of less than 50 nm, a substrate current of more than 100 µA, and a resistance in the range from $0.1$–$10$ $\Omega$-$\mu m^2$.

It is an advantage of this invention that SVT sensor side-reading may be limited with standard processing steps during slider fabrication. It is a feature of the method of this invention that an over-etching step may be employed to leave the SVT base region isolated on a semiconductor pedestal, which may then be covered with FM shield material to minimize sensitivity to magnetic fields at the sides. Such a procedure may provide RW of less than 250 nm.

It is yet another purpose of this invention to provide for additional semiconductor transistor structures, such as a transistor amplifier and the like, during slider fabrication. It is an advantage of the method of this invention that additional semiconductor thin-film fabrication steps may be performed during the SVT fabrication process to create any desired transistor structures and all related interconnection structures in the same slider substrate.

In one aspect, the invention is a method for fabricating a slider having an integral SVT disposed at an air-bearing surface (ABS) including the steps of (a) preparing a polished semiconductor wafer surface, (b) forming a sensor stack having a top surface and including a first FM layer in contact with and forming a Schottky barrier at the semiconductor wafer surface, (c) removing material from the sensor stack to form two sides defining the RW, (d) forming a FM shield layer over the milled sensor stack and in electrical contact with the top surface thereof, (e) forming a SVT emitter terminal, a SVT collector terminal and a SVT base terminal, and (f) polishing an edge of the semiconductor wafer to expose the ABS.

In another aspect, the invention is a slider including a monolithic semiconductor substrate disposed at an ABS, an integral SVT disposed on the semiconductor substrate at the ABS, including a sensor stack having a top surface and including a first FM layer in contact with and forming a Schottky barrier at the monolithic semiconductor substrate, a FM shield layer disposed over the sensor stack and in electrical contact with the top surface thereof, and a SVT emitter terminal, a SVT collector terminal and a SVT base terminal.

In yet another aspect, the invention is a magnetic data storage drive for storing data on a magnetic medium, including a housing, a slider including a monolithic semiconductor substrate disposed at an ABS and an integral magnetic write head having two FM pole piece layers that have a yoke portion located between a pole tip portion and a back gap portion, the pole piece layers being connected at their back gap portions, a nonmagnetic write gap layer located adjacent a pole tip portion, an insulation stack with at least one coil layer embedded therein located between the yoke portions of the pole piece layers, and an integral read head having a SVT disposed on the semiconductor substrate at the ABS including a sensor stack having a top surface and having a first FM layer in contact with and forming a Schottky barrier at the monolithic semiconductor substrate, a FM shield layer disposed over the sensor stack and in electrical contact with the top surface thereof, and a SVT emitter terminal, a SVT collector terminal and a SVT base terminal, a support fixed to the housing for supporting the slider, medium moving means fixed to the housing for moving the magnetic medium past the slider in a transducing relationship with the integral magnetic head, positioning means coupled to the support for moving the slider to a plurality of positions with respect to the moving magnetic medium, and control means coupled to the magnetic head, the medium moving means and the positioning means for controlling and processing signals with respect to the magnetic head, controlling movement of the magnetic medium and controlling the position of the slider.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIG. 1 illustrates a typical spin-valve transistor (SVT) embodiment from the prior art;

FIG. 2 illustrates the air-bearing surface (ABS) view of the integral SVT of this invention;

FIG. 2A illustrates the magnetocurrent flow in the SV stack portion of the integral SVT from FIG. 2;

DESCRIPTION OF THE PREFERRED EMBODIMENT

Figure 3:
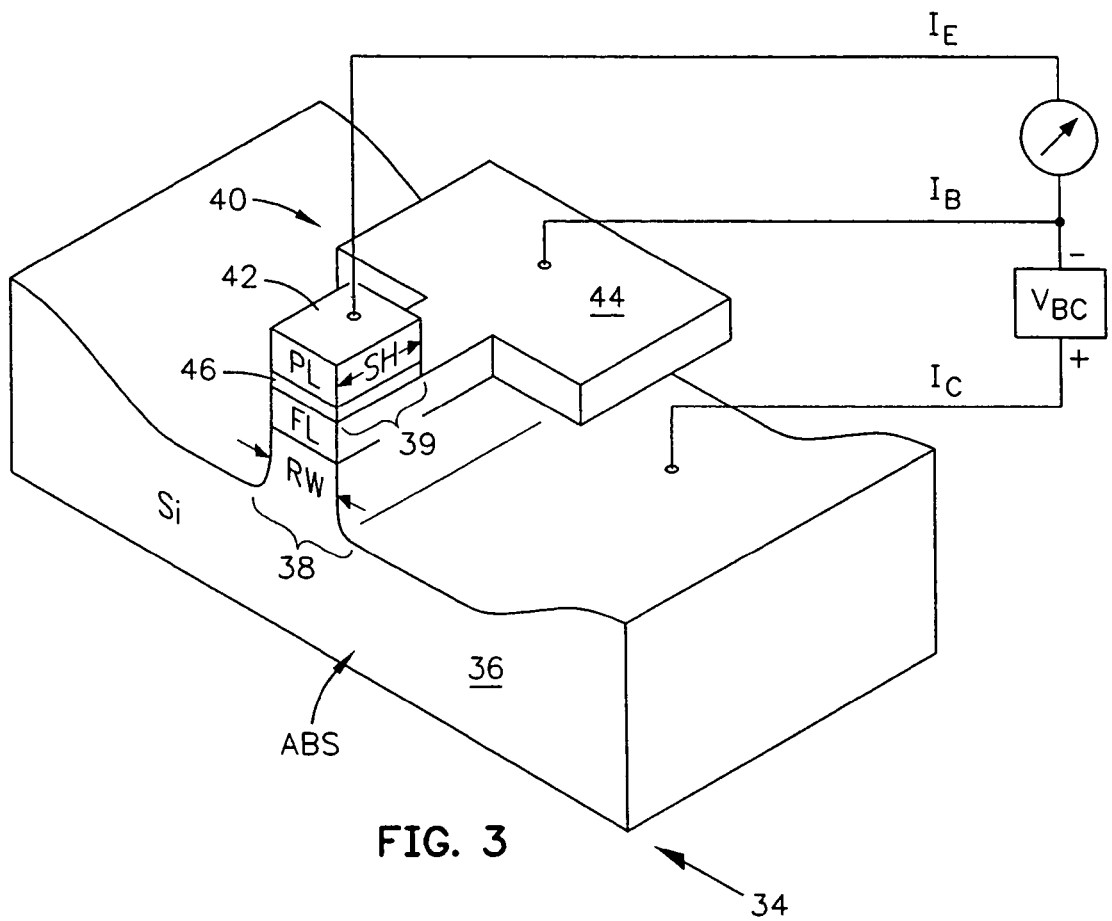
FIG. 3 illustrates an isometric view of the sensor stack portion of an exemplary embodiment of the integral SVT of this invention.

FIG. 2 (not to scale) illustrates a portion of the air-bearing surface (ABS) of the slider of this invention, limited to the ABS view of the integral spin valve transistor (SVT) 34 of this invention. The monolithic wafer semiconductor collector layer 36 carries the collector current $I_C$ of SVT 34 and supports a semiconductor pedestal 38. The width of semiconductor pedestal 38 generally defines the read width (RW) of SVT 34, which may be 250 nm, for example. Semiconductor pedestal 38 supports a sensor stack 40, which has a similar width RW over a depth defined by the stripe height (SH) 39 as shown. Sensor stack 40 may have a total thickness of 50 nm, for example, and may, for example, include a spin valve (SV) stack including a FM pinned layer structure 42 separated from a FM free layer 44 by the conductive nonmagnetic spacer layer 46. FIG. 2 is not to scale and spacer layer 46 may consist of a 2.0 nm layer of copper, for example. Alternatively, sensor stack 40 may, for example, include a tunnel valve (TV) stack wherein spacer layer 46 is embodied as a tunnel barrier layer consisting of, for example, 1.0 nm of alumina.

Sensor stack 40 is enveloped on top and on both sides by the ferromagnetic (FM) shield layer 48, which may include an electroplated NiFe alloy with 19% iron by weight, for example. Shield layer 48 is in electrical contact with the top surface 50 of pinned layer structure 42 and thus serves as the emitter terminal of SVT 34, which carries the emitter current $I_E$. An intermediate insulating layer 52, which may include alumina or silicon dioxide or both, for example, insulates shield layer 48 electrically from the sides of sensor stack 40 and semiconductor collector layer 36. Provision for coupling the base current $I_B$ at free layer 44 is made behind the visible elements seen in FIG. 2 (see FIG. 3). In operation, the magnetic moment of free layer 44 rotates in response to the direction of the external magnetic field at the ABS, which may represent data stored on a magnetic medium adjacent the ABS, for example. Because the magnetic moment of pinned layer structure 42 is fixed by means of elements within structure 42 (see FIG. 5), the moment of free layer 44 rotates with respect thereto as the external magnetic field fluctuates (see FIG. 2A). When the moments of both layers 42 and 44 are aligned, the magnetocurrent $I_M$ flowing through sensor stack 40 and the sense current $I_S$ flowing through pinned layer structure 42 rises with respect to the respective current flows when the moments of layers 42 and 44 are misaligned. Thus, external magnetic field fluctuations are sensed as current fluctuations in the current sensor 54.

FIG. 3 shows an isometric view of SVT 34 with magnetic shield layer 48 and insulating layer 52 removed to permit viewing of the hidden portions of sensor stack 40 supported on semiconductor collector layer 36. Note that the base current $I_B$ of SVT 34 flows to free layer 44 substantially as shown. The structure and composition of SVT 34 may be appreciated with reference to the description of the fabrication method of this invention illustrated in FIGS. 7–8.

Figure 4:
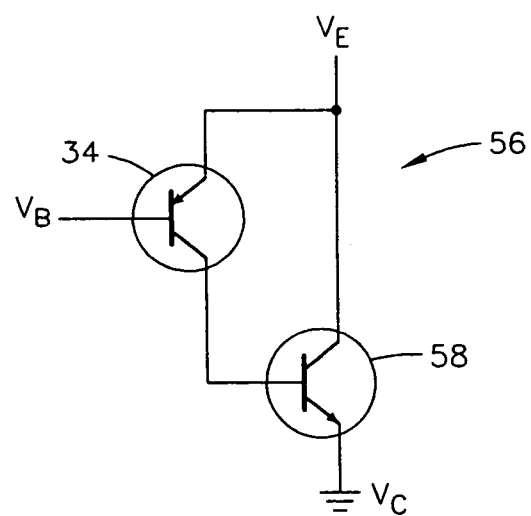
FIG. 4 is a schematic circuit diagram illustrating an exemplary embedded amplifier employing the integral SVT of this invention and a bipolar transistor.

FIG. 4 is a schematic circuit diagram illustrating an exemplary integrated amplifier 56 of this invention employing SVT 34 (FIGS. 2–3) and a bipolar transistor 58, for example. Bipolar transistor 58 may be fabricated using conventional thin-film techniques during fabrication of SVT 34 and is merely exemplary of the sort of semiconductor structures suitable for integration with SVT 34 in the slider of this invention. Of course, a PNP embodiment of bipolar transistor 58 should be connected in the emitter circuit of SVT 34 and a NPN embodiment of bipolar transistor 58 should be connected in the collector circuit of SVT 34, as may be readily appreciated by anyone skilled in the electronic arts. Amplifier 56 can provide any necessary signal gain within micrometers of the ABS, thereby compensating for the relatively low gain of SVT 34 and increasing SVT sensor bandwidth.

Figure 5:
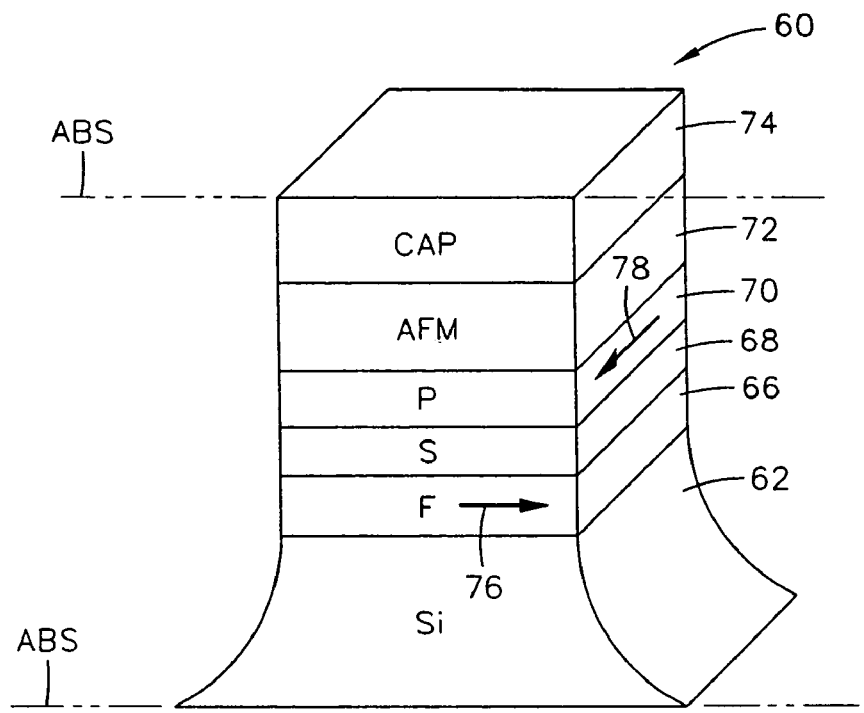
FIG. 5 illustrates an isometric view of the ABS of a spin valve (SV) stack suitable for use in the slider of this invention.

FIG. 5 is an illustration in perspective of the ABS of a SV stack 60 suitable for use in the slider of this invention. SV stack 60 is formed on a semiconductor pedestal 62 and may include a free layer 66 of nickel-iron (NiFe), a spacer layer 68 of copper (Cu), a pinned layer 70 of cobalt (Co), an antiferromagnetic (AF) pinning layer 72 of platinum-manganese (PtMn) and a cap layer 74 of tantalum (Ta). The magnetic layer moments may be oriented, for example, such that the magnetic moment 76 in free layer 66 is oriented to the right parallel to the ABS and the magnetic moment 78 of the pinned layer is oriented downward and perpendicular to the ABS.

A Tunnel Valve Transistor (TVT) is a three-terminal device that is closely analogous to the SVT and the terms are interchangeable for the purposes of this description. The only substantive physical difference is that the metal TVT base layer includes a magnetic tunnel valve (TV) stack instead of the SV stack provided in the base layer of a SVT. As used herein, the TV stack term also denotes the tunnel valve (TV) stack, which is known in the art to include a magnetic free layer separated from a magnetic pinned layer by a nonmagnetic nonconductive spacing (tunnel barrier) layer. The slider of this invention may be embodied with an integral TVT or an integral SVT and the SVT term is used herein to refer generally to either or both such embodiments unless more specifically indicated. Moreover, the base layer of the SVT of this invention may be embodied as one or more sensor stacks. That is, the SVT base layer described herein may include one or more SV stacks and the TVT base layer may include one or more TV stacks disposed in series so that the magnetocurrent passes through each sensor stack. As used herein, a "sensor stack" generally denominates either one or more SV stacks or one or more TV stacks or a combination of both SV and TV stacks unless more specifically indicated.

Figure 6:
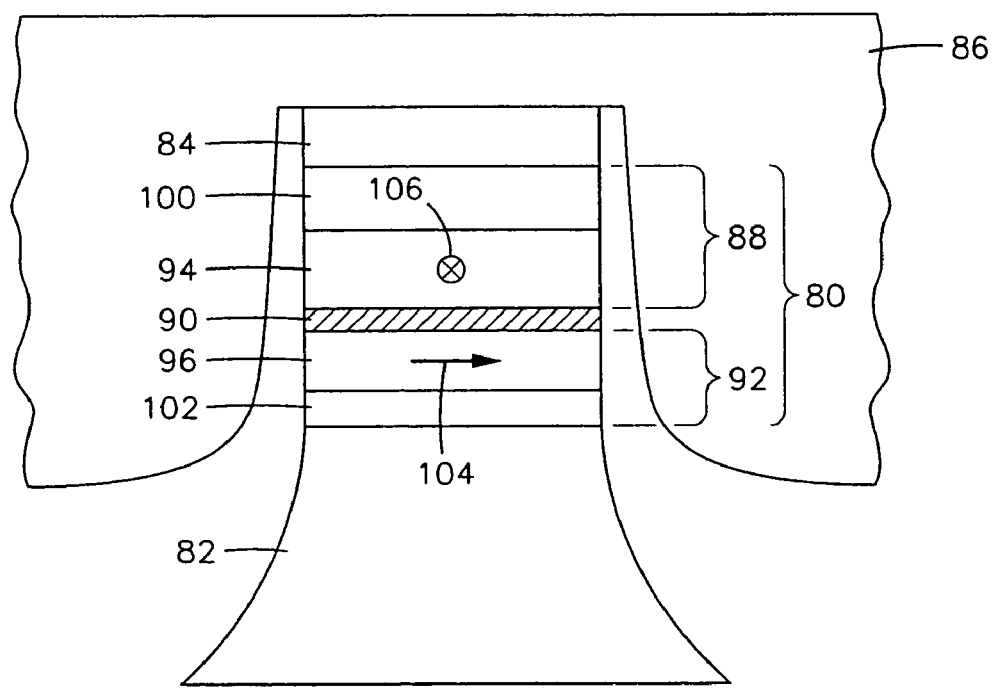
FIG. 6 is a cross-sectional view of a tunnel valve (TV) stack suitable for use in the slider of this invention.

FIG. 6 is a cross-sectional view of a TV stack 80 suitable for use in the slider of this invention. TV stack 80 is formed on a semiconductor pedestal 82 as a stack of layers between semiconductor pedestal 82 and a top electrical conductor 84. Top electrical conductor 84 is directly connected to the FM shield layer 86, which may itself form part of the electrical connection to TV stack 80. TV stack 80 includes a first or top electrode multilayer stack 88, an insulating tunnel barrier layer 90, and a second or bottom electrode stack 92. Top and bottom electrode stacks 88 and 92 each includes a FM layer, the pinned layer 94 and the free layer 96, respectively, in direct contact with tunnel barrier layer 90. Electrode multilayer stack 88 also includes a layer of AF material 100, formed on and exchange-coupled with underlying pinned FM layer 94. Bottom electrode stack 92 may include a seed layer 102 on which is formed free layer 96, whose magnetization direction is free to rotate in the presence of external magnetic fields. Free layer 96 is fabricated so as to have its magnetic moment or magnetization direction (shown by the arrow 104) oriented generally parallel to the ABS (in a plane parallel to the paper) and generally perpendicular to the magnetization direction of pinned layer 94 in the absence of an external magnetic field. Pinned layer 94 in electrode stack 88 has its magnetization direction (shown by the arrow 106) fixed generally perpendicular to the ABS (out of or into the paper) by interfacial exchange-coupling with AF layer 100, which also forms part of top electrode stack 88.

Figure 7A:
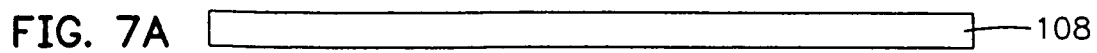
FIGS. 7A–M are a series of process flow diagrams illustrating a wafer cross-sectional view of the basic masking, etching, milling and rinsing steps necessary to create the integral SVT of this invention.
Figure 7B:
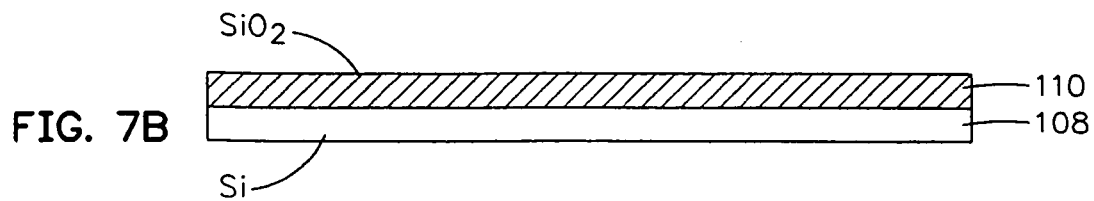
Figure 7C:
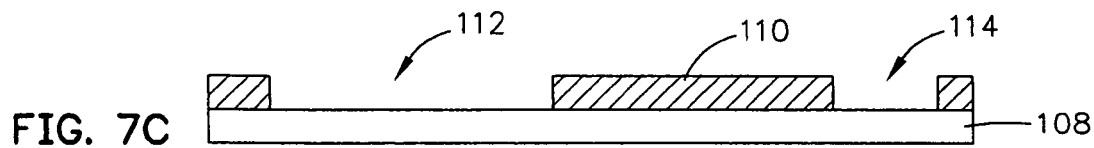
Figure 7D:
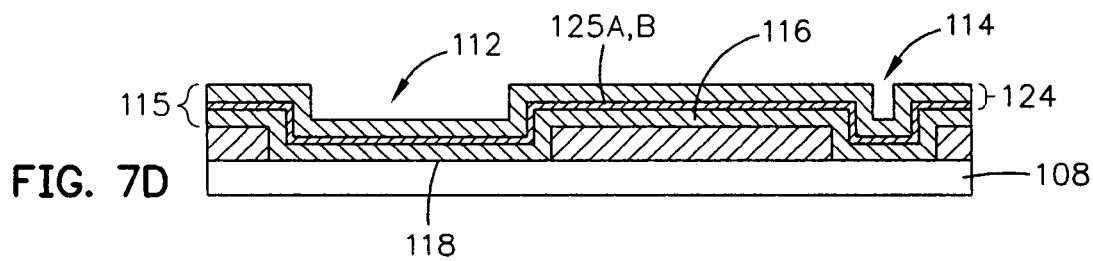
Figure 7E:
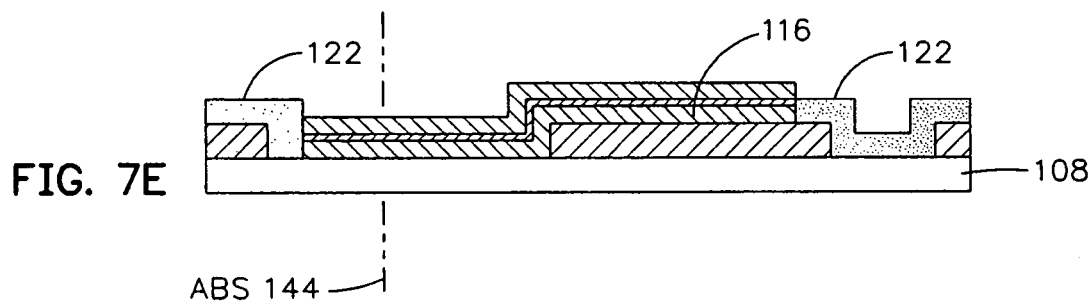

FIGS. 7A–M is a series of process flow diagrams illustrating a wafer cross-sectional view of the basic masking, etching, milling and rinsing steps necessary to create the integral SVT of this invention and may be better appreciated with reference to FIGS. 8A–8G. FIG. 7A shows the initial semiconductor wafer 108 after surface polishing and preparation. FIG. 7B shows the silicon dioxide layer 110 formed on the surface of semiconductor wafer 108 by the first step. FIG. 7C shows the two holes 112 and 114 milled or etched in insulating layer 110 after a masking, etching and rinsing procedure to expose the underlying semiconductor layer 108. In FIG. 7D, a sensor stack layer structure 115, including a FM free layer 116 and the remaining sensor stack layers 124, has been formed over the entire wafer so that a Schottky barrier 118 is created in hole 112 (and another in hole 114) where free layer 116 contacts semiconductor wafer 108.

Alternatively, steps 7A–C may be omitted and the native semiconductor surface prepared instead, such as by full-film etching the native oxide on a silicon wafer surface. Step 7D may then be accomplished by full-film deposition of sensor stack layer structure 115. However, such an alternative procedure produces increased base-collector capacitance, which may be disadvantageous.

In a SV stack (e.g., FIG. 5), the remaining layers 124 may include a copper spacing layer 125A followed by a pinned layer structure 127, for example. In a TV stack (e.g., FIG. 6), layers 124 may include a tunnel barrier layer 125B followed by pinned layer structure 127, for example. Alternatively, in addition to the remainder of a first SV (or TV) stack, layers 124 may include another free layer (not shown) and the remainder of a second SV (or TV) stack (not shown), or a plurality of SV (or TV) stacks (not shown), for example.

Figure 8A:
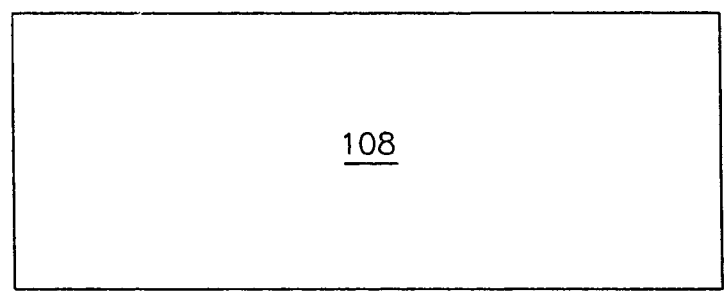
FIGS. 8A–G are a series of process flow diagrams illustrating the wafer-surface view of the basic lithographic patterning steps necessary to create the integral SVT of this invention.
Figure 8B:
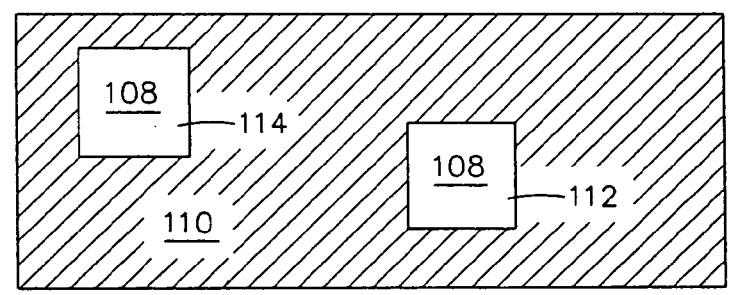
Figure 8C:
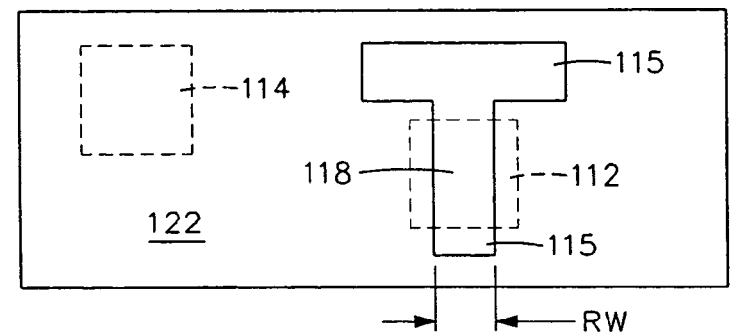
Figure 8D:
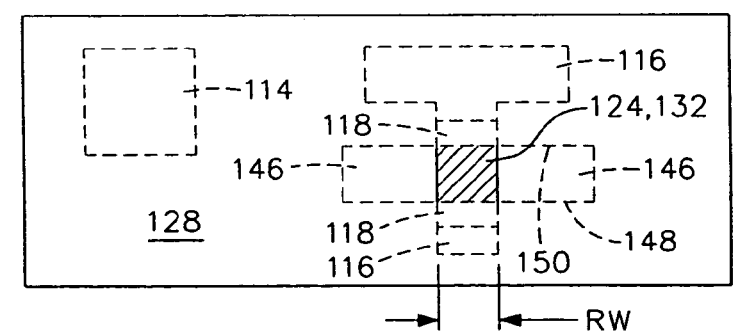
Figure 8E:
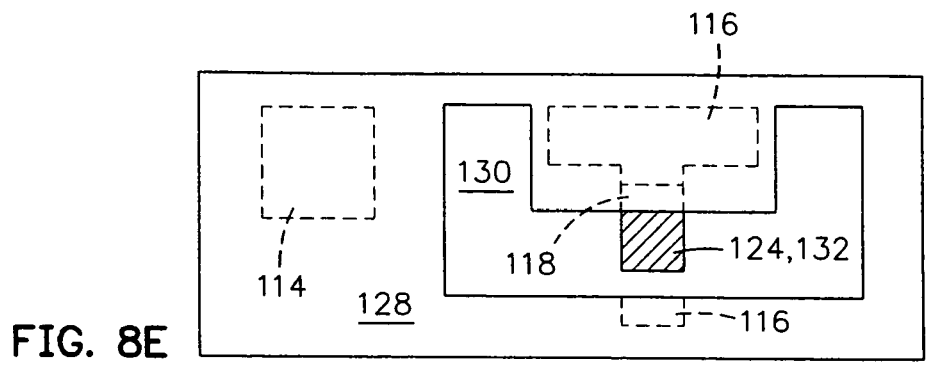
Figure 8F:
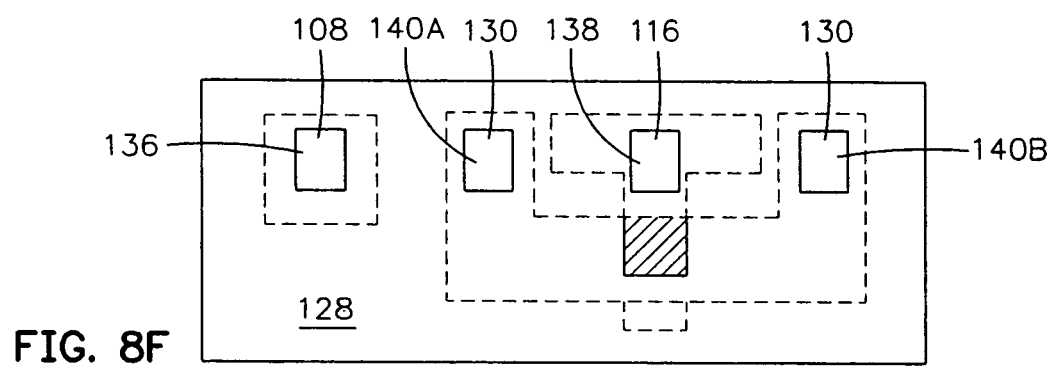
Figure 8G:
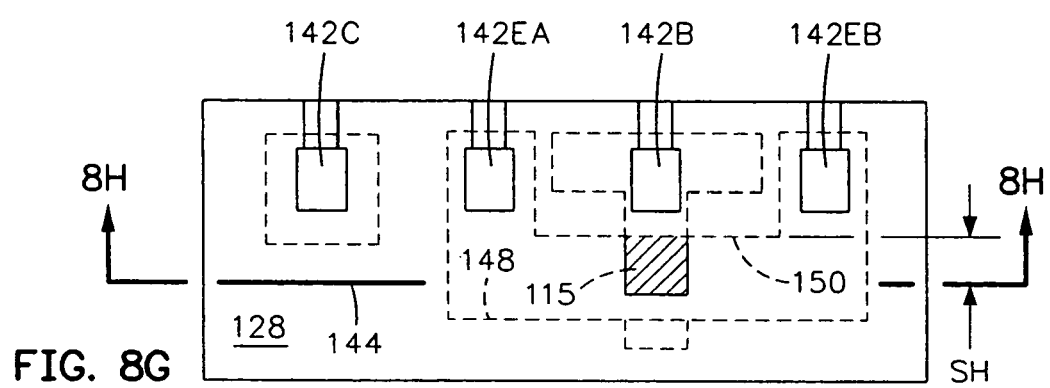
Figure 8H:
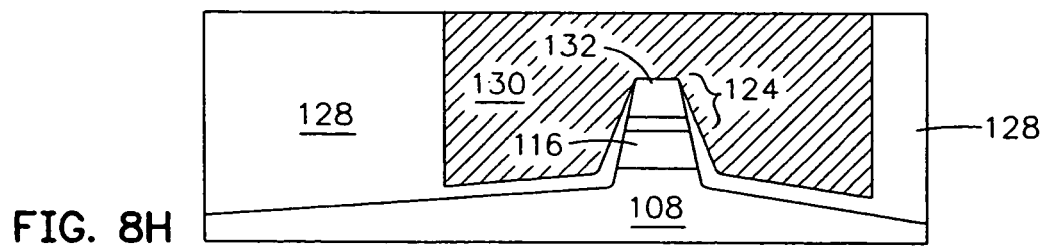
FIG. 8H is a cross-section taken from FIG. 8G showing the ABS view of the SVT of this invention.

In the first masking and milling step, the RW dimension of the sensor stack formed by layers 116 and 124 is defined in the plane of the ABS (perpendicular to the page in FIG. 7E) by over-milling down into semiconductor wafer 108 to form the sensor stack on a semiconductor pedestal (seen in FIG. 8H). In the same steps, as seen in FIG. 8C, portions of sensor layers 115 at the front and back edges (perpendicular to the page in FIG. 7E) are also removed and replaced with an oxide refill layer 122.

Figure 7F:
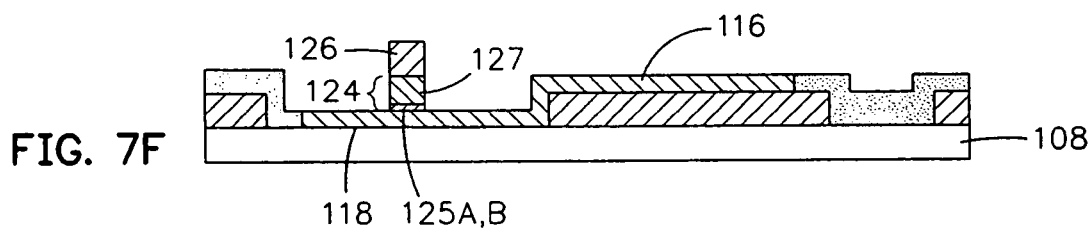

In the second masking and milling or etching steps, illustrated in FIG. 7F, a resist layer 126 is formed to protect a portion of layers 124 before the remainder of layers 124 are milled or etched away. FIG. 7F shows the wafer cross-section after resist has been patterned and layers 124 substantially removed but before the oxide refill layer 128 is deposited at this level. The material removed from layers 124 includes pinned layer structure 127 and adjacent layer 125 (whether copper-spacer or tunnel-barrier) separating pinned layer structure 127 from free layer 116. Generally, after each masking and milling/etching step, another oxide refill layer is formed until it is substantially coplanar with the existing sensor stack layers. Preferably, each oxide refill layer includes material of similar composition (e.g., alumina or silica) and thickness.

Alternatively, the two masking and milling steps may be swapped so that the first masking and milling step (see FIG. 8D) merely removes the unwanted portions of pinned layer structure 127 and copper spacing (or tunnel barrier) layer 125 leaving free layer 116. This is then refilled with an oxide refill layer 122 of about the thickness of the removed layers. A second masking and milling step (see FIG. 8C) then defines the RW dimension of silicon pedestal 38 (FIG. 3).

Figure 7G:
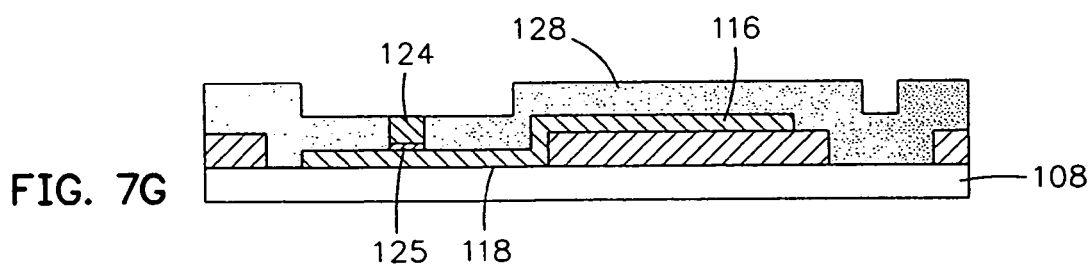

After the two masking and milling/etching procedures resulting in FIG. 7F, an alumina (for example) layer 128 is formed over the entire surface followed by the removal of resist layer 126 to create the result illustrated in FIG. 7G, wherein alumina layer 128 is depicted as generally coplanar with sensor stack layers 124. Although not visible in the cross-sectional view of FIG. 7G, oxide refill layer 128 also extends over the sides of the sensor stack and semiconductor pedestal formed in layers 124, 116 and 108 defined by the earlier over-milling step (FIGS. 2–3 and 8H).

Figure 7H:
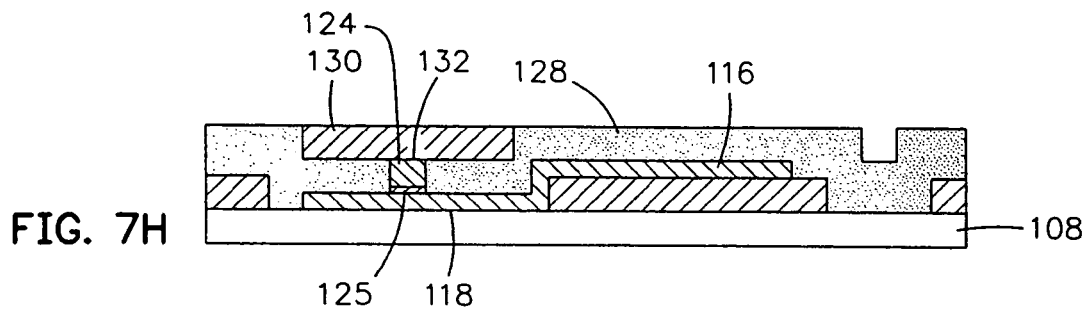

Next, a FM seed layer is deposited on which an electroplated FM shield layer 130 is formed before lifting off the masking layer to leave shield layer 130 over and in electrical contact with the top surface 132 of layers 124 as shown in FIG. 7H. Although not visible in the cross-sectional view of FIG. 7H (see FIG. 8E), shield layer 130 also extends over the sides of the sensor stack and semiconductor pedestal formed in layers 124, 116 and 108 to minimize sensitivity to magnetic fields at the sides of the RW region defined by the earlier over-milling step (FIGS. 2–3 and 8H).

Figure 7I:
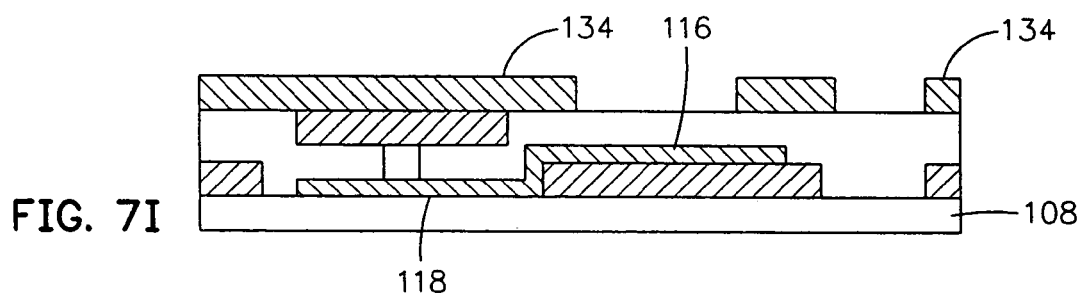
Figure 7J:
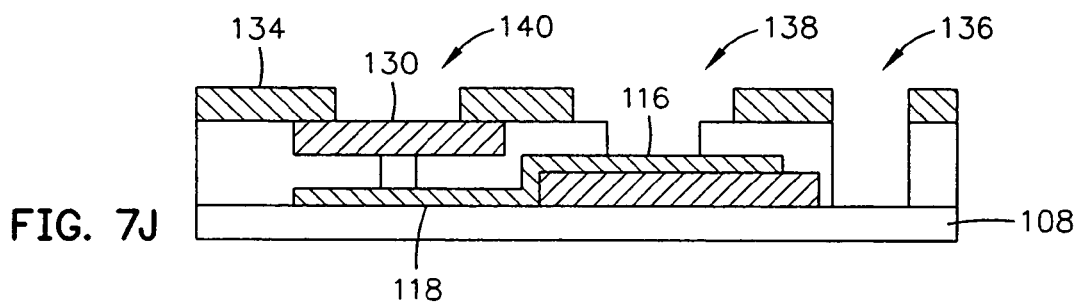

The wafer surface is next patterned for milling or etching the conductor vias required for the metal emitter, base and collector conductors, leaving the patterned resist layer 134 shown in FIG. 7I. The etching step forms the via hole 136 to expose semiconductor layer 108 and forms the via hole 138 to expose free layer 116. After etching, resist layer 134 is selectively removed from the via hole 140 to expose shield layer 130, as shown in FIG. 7J. The edge of via 140 may or may not extend beyond the ABS 144 (see FIGS. 7K or 8G).

Figure 7K:
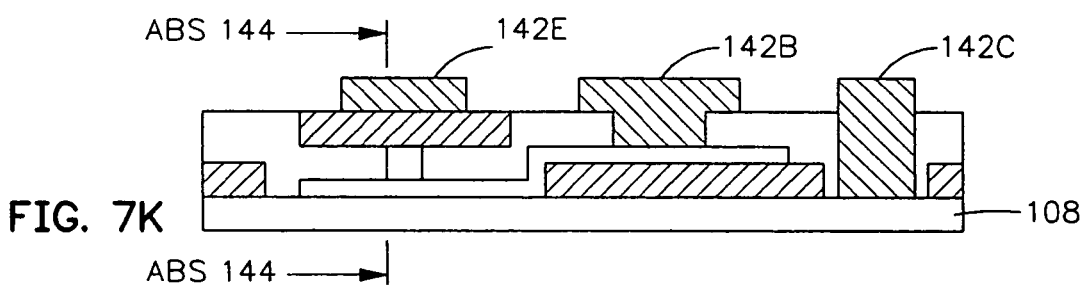

The metal conductor layer 142 (Ta or Au or NiFe, for example) is then formed and resist layer 134 rinsed to create the SVT emitter conductor 142E, the SVT base conductor 142B and the SVT collector conductor 142C as shown in FIG. 7K. Finally, the monolithic semiconductor wafer edge is formed to expose ABS 144, which is perpendicular to the plane of the paper in FIG. 7K. Because shield 130 also functions as part of the emitter conductor, a second via hole 140 and conductor 142E is preferred to increase conductivity though shield 130, although this is not visible in the cross-sectional view of FIG. 7K (see FIG. 8G).

Figure 7L:
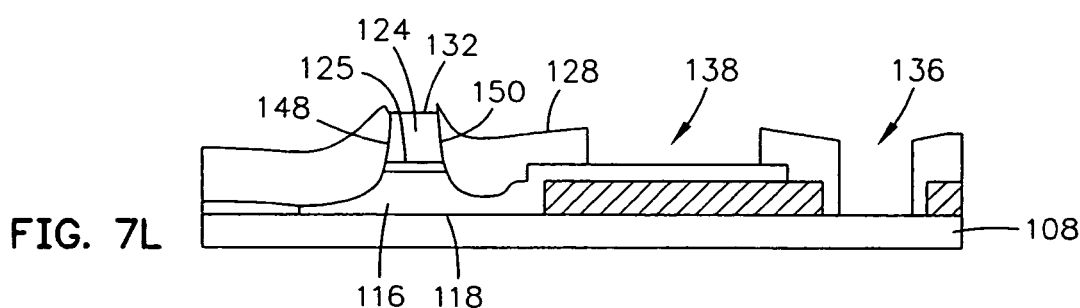
Figure 7M:
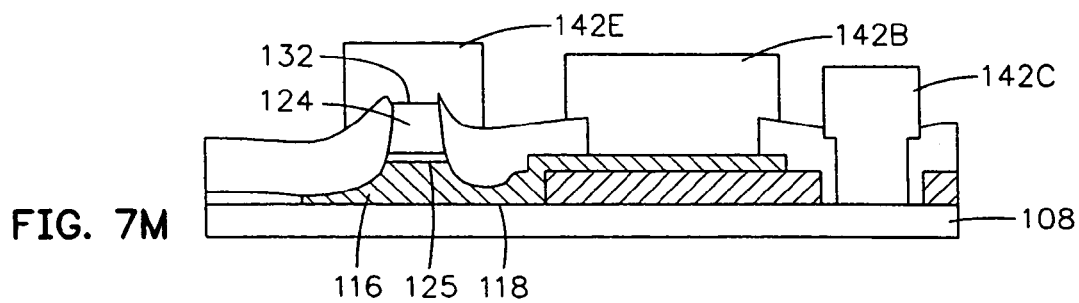

FIGS. 8A–G are a series of process flow diagrams illustrating the wafer-surface view of the basic lithographic patterning steps necessary to create the integral SVT of this invention and may be better appreciated with reference to FIGS. 7A–M. FIG. 8A shows the facial view of semiconductor wafer 108, shown in cross-section in FIG. 7A, after surface polishing and preparation. FIG. 8B shows silicon dioxide layer 110, for example, formed on the surface of semiconductor wafer 108 by the first step with holes 112 and 114 in insulating layer 110 and shown in cross-section in FIG. 7C, after a masking, etching and rinsing procedure to expose the underlying semiconductor layer 108.

In the first masking and milling/etching procedure, as seen in FIG. 8C, the sensor stack layer structure 115, including FM free layer 116 and remaining layers 124, are first formed over the entire wafer and then etched or milled to remove all of sensor stack layer structure 115 except for the T-shaped portion shown. Schottky barrier 118 is formed in hole 112 where free layer 116 contacts semiconductor surface 108. The removal of the remainder of sensor stack layer structure 115 re-exposes semiconductor surface 108 throughout hole 114 and through a small portion of hole 112 next to Schottky barrier 118, which is over-milled into semiconductor layer 108 to form a semiconductor pedestal (FIG. 8H). Oxide refill layer 122 is then formed over everything before removing resist layer 120 to lift off the alumina above the remaining sensor stack layer structure 115. Free layer 116 at the bottom of sensor stack layer structure 115 is insulated from semiconductor surface 108 by silicon dioxide layer 110 except for the portion shown in Schottky junction 118 at hole 112. This first masking and milling/etching procedure defines the RW of the integral SVT of this invention.

FIG. 8D shows the features resulting from the second masking and milling/etching procedure, and the alumina deposition step described above with reference to FIGS. 7F–G. Hole 114 is now filled with oxide from layer 122 and further covered with alumina layer 128. A second masking and milling/etching procedure removes the remaining layers 124 shown in FIG. 8D in the regions not protected by the pin layer mask 146, which defines the SVT front edge 148 and the SVT rear edge 150. This second masking and milling/etching procedure thereby defines the SH of the SVT and removes everything down into free layer 116 in pin layer mask region 146 (see FIG. 8H). Pin layer mask region 146 is then covered by alumina layer 128 except for the exposed top surface 132 of remaining sensor stack layers 124, as is shown in cross-section in FIG. 7G. Free layer 116 is also covered by alumina layer 128 except for the mill-defined RW portion under sensor stack layers 124. Schottky junction 118 in hole 112 may extend outside of pin layer mask region 146 as well as under remaining sensor stack layers 124.

Alternatively, the two masking and milling steps illustrated in FIGS. 8C–D may be swapped, thereby first defining the SH dimension and thereafter defining the RW dimension of the SVT.

Next, an electroplated FM material layer is formed over the top surface 132 of layers 124 to create shield layer 130 over and in electrical contact with top surface 132, as shown in cross-section in FIG. 7H. Shield layer 130 covers the sides of the sensor stack and semiconductor pedestal formed in pin layer mask region 146 and covers large regions to the side and rear of the surface for later use as emitter contacts.

The surface is next patterned and milled or etched to form via hole 136 exposing semiconductor layer 108, via hole 138 exposing free layer 116, and the two via holes 140A and 140B exposing shield layer 130, as shown in FIG. 8F and in cross-section in FIG. 7J. The metal conductor layer 142 (Ta or Au, for example) is then formed to create the SVT emitter conductors 142EA and 142EB, the SVT base conductor 142B and the SVT collector conductor 142C, as shown in FIG. 8G and in cross-section in FIG. 7K.

Finally, the monolithic semiconductor wafer edge is formed to expose ABS 144, which is perpendicular to the plane of the paper in FIG. 8G. FIG. 8G shows only the read sensor portion of the slider ABS 144. The SH of the read sensor is the distance between ABS 144 and rear edge 150 of sensor stack layer structure 115 as shown. FIG. 8H is a cross-section taken from FIG. 8G showing the ABS view of ABS 144. Note the semiconductor pedestal geometry formed in the etching or milling of pin layer mask region 146 described above.

Alternatively, the SVT terminals may be connected as shown in FIGS. 7L and 7M. After the process point shown in FIG. 7G, additional vias may be etched in alumina layer 128 to create a collector via at via hole 138 and a base via at via hole 136. As shown in FIGS. 7L–7M, it is possible that a milling or etching procedure may produce SVT front edge 148 and SVT rear edge 150 as non-vertical boundaries. It is the distance between ABS 144 and rear edge 150 that defines the SH of sensor stack layer structure 115.

After forming all SVT connections, a full film NiFe layer may be deposited over the wafer followed by a masking and plating procedure. After removing the mask layer to lift off the seed and electroplate layers, the remaining NiFe vias provide SVT connections and magnetic shielding. As shown in FIG. 7M, emitter connection stud 142E, collector connection stud 142C, and base connection stud 142B are then preferably composed of the NiFe material from the electroplated shield layer 130.

Alternatively, the configuration of sensor stack layer structure 115 may be inverted from that shown in FIGS. 1–8. That is, for example, pinned layer structure 127 may be disposed adjacent semiconductor wafer 108 instead of free layer 116. Free layer 116 may be disposed at the top of sensor stack layer structure 115 instead of pinned layer structure 127. The two FM layers are separated by copper spacing (or tunnel barrier) layer 125 substantially as shown whether inverted or not. The inverted alternative configuration may entail a change in the electrical bias at the SVT operating point but does not otherwise affect SVT operation.

Figure 9:
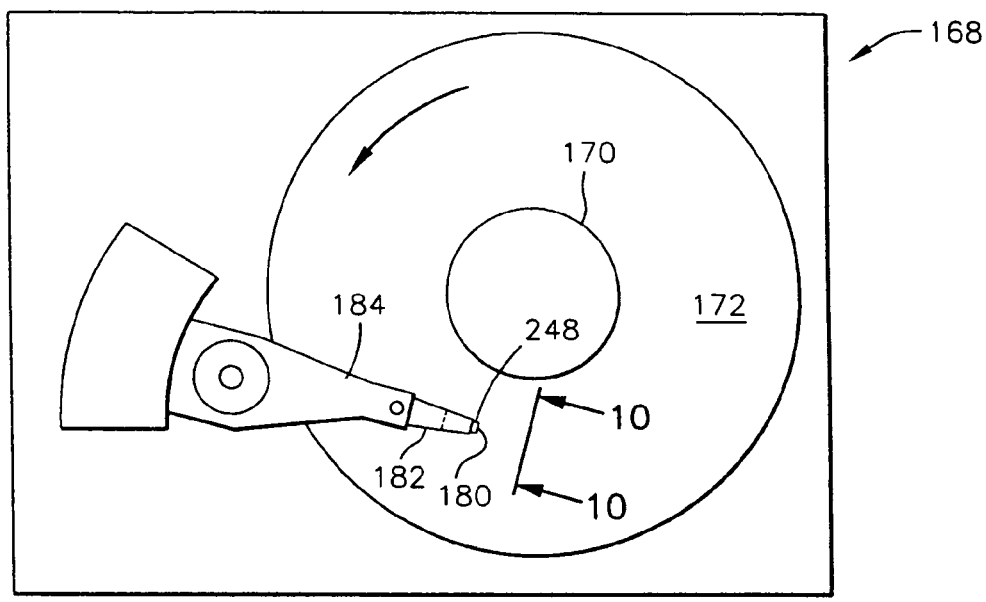
FIG. 9 is a plan view of an exemplary magnetic disk drive suitable for use with the integrated slider of this invention.
Figure 10:
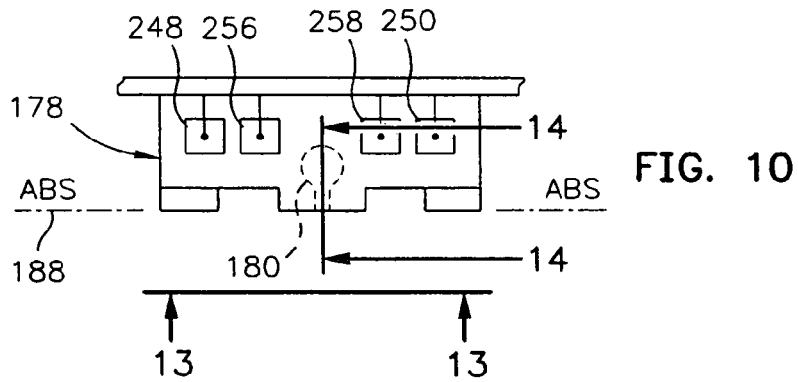
FIG. 10 is an end view of an exemplary integrated slider of this invention in the disk drive as seen in plane 10—10 of FIG. 9.
Figure 11:
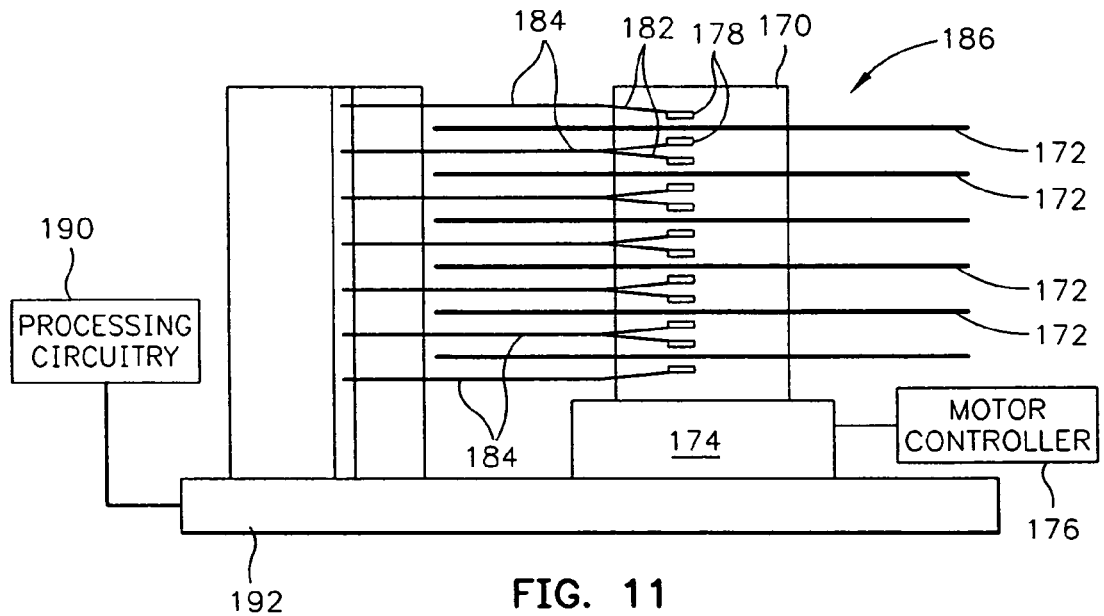
FIG. 11 is a schematic elevation view of the magnetic disk drive of FIG. 9 wherein multiple disks and magnetic heads are employed.

FIGS. 9–11 illustrate a magnetic disk drive 168 useful with a read/write slider assembly using the SVT sensor of this invention discussed above in connection with FIGS. 1–8. Magnetic disk drive 168 includes a spindle 170 that supports and rotates a magnetic disk 172. Spindle 170 is rotated by a motor 174 that is controlled by a motor controller 176. A slider 178 with integral read and write magnetic head 180 is supported by a suspension 182 and an actuator arm 184. A plurality of disks, sliders and suspensions may be employed in a large-capacity direct access storage device (DASD) 186 as shown in FIG. 11. Suspension 182 and actuator arm 184 position slider 178 so that magnetic head 180 is in a transducing relationship with a surface of magnetic disk 172. When disk 172 is rotated by motor 174, slider 178 is supported on a thin (typically, 50 nm) cushion of air (air bearing) between the surface of disk 172 and the ABS 188. Magnetic head 180 may then be employed for writing information to multiple circular tracks on the surface of disk 172, as well as for reading information therefrom. The processing circuitry 190 exchanges signals, representing such information, with magnetic head 180, provides motor drive signals for rotating the magnetic disk 172, and provides control signals for moving slider 178 to various tracks.

Figure 12:
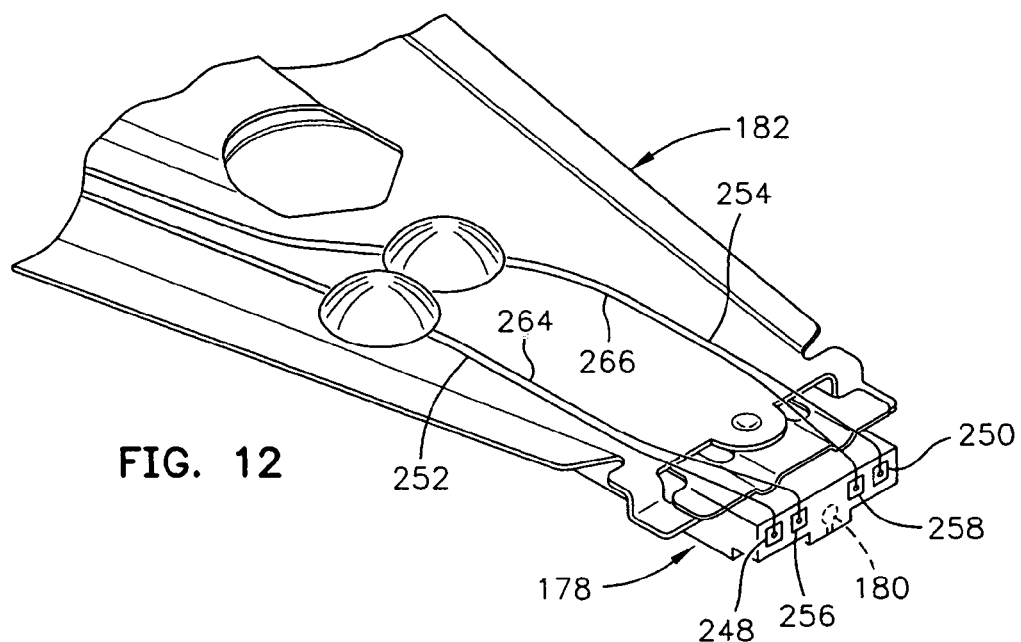
FIG. 12 is an isometric illustration of an exemplary suspension system suitable for supporting the integrated slider of this invention.

In FIG. 12, slider 178 is shown mounted to suspension 182. The components described hereinabove may be mounted on a housing frame 192, as shown in FIG. 11. FIGS. 10 and 12 illustrate a mounted slider 178 having two read and two write connections (248, 250, 256 and 258), which may be insufficient to completely connect to the three-terminal SVT of this invention. However, in view of these teachings, practitioners in the art can readily appreciate how to add to slider 178 any connections and leads needed to accommodate the three-terminal SVT of this invention.

Figure 13:
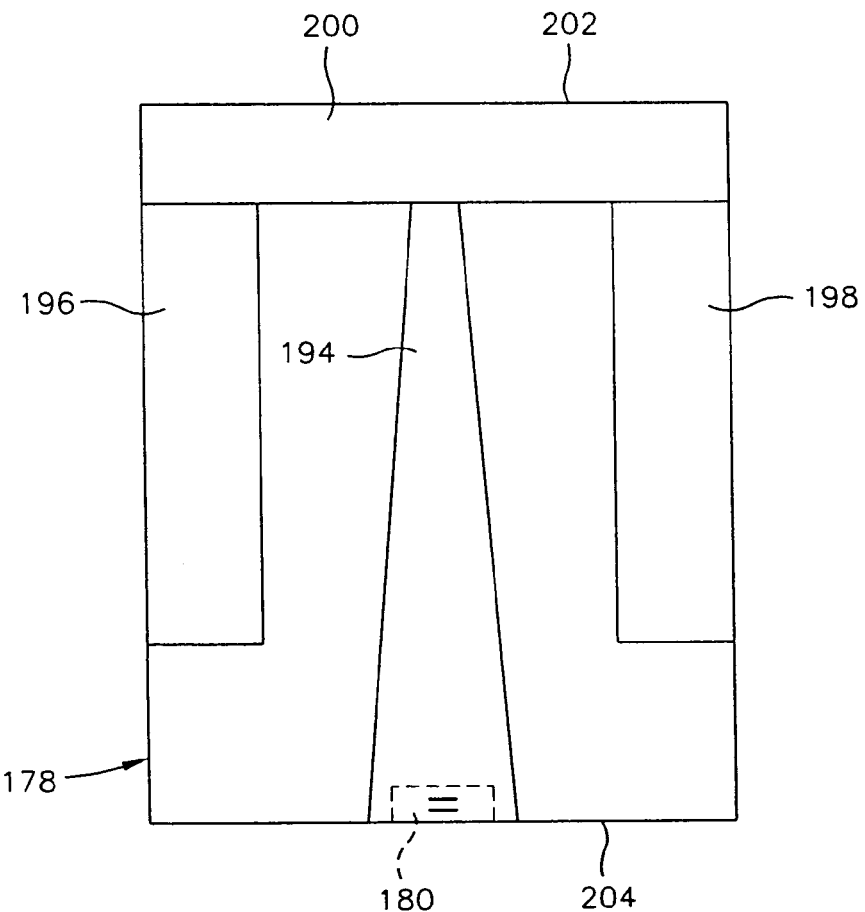
FIG. 13 is an ABS view of the exemplary integrated slider of this invention taken along plane 13—13 of FIG. 10.

FIG. 13 is an ABS view of exemplary slider 178 with integral magnetic head 180. The ABS of integral slider 178 is formed with suitable masking and milling or etching procedures and includes a center rail 194 surrounding the integral magnetic head 180 and the side rails 196 and 198. Rails 194, 196 and 198 join with a cross rail 200 substantially as shown. Alternatively, slider 178 may include pads (not shown) instead of rails 194, 196, for example. With respect to the rotational direction of magnetic disk 172, cross rail 200 is at a leading edge 202 of slider 178 and magnetic head 180 is at a trailing edge 204 of slider 178, thereby providing useful aerodynamic behaviors.

Figure 14:
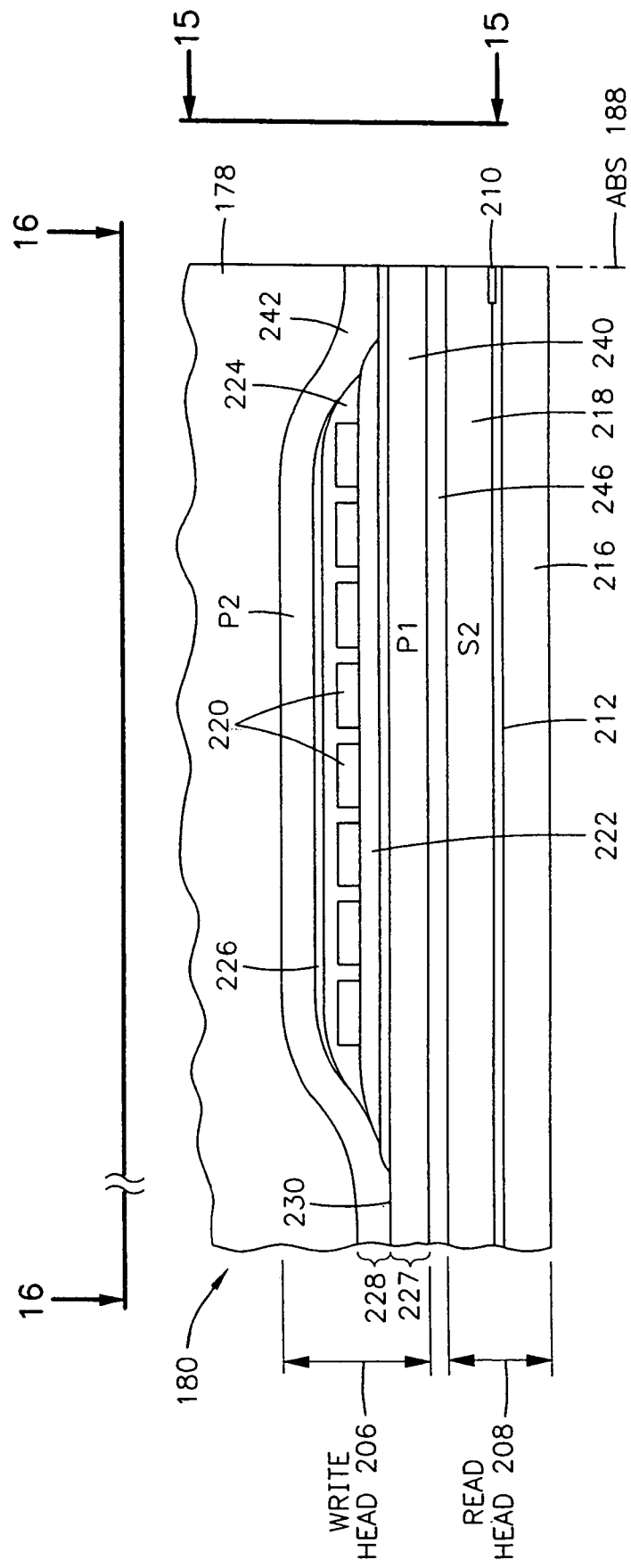
FIG. 14 is a partial view of the exemplary integrated slider of this invention as seen in plane 14—14 of FIG. 10.

FIG. 14 is a side cross-sectional elevation view of an exemplary piggyback embodiment of read/write head 180, which includes a write head portion 206 and a read head portion 208 employing the SVT of this invention (FIG. 2).

Figure 15:
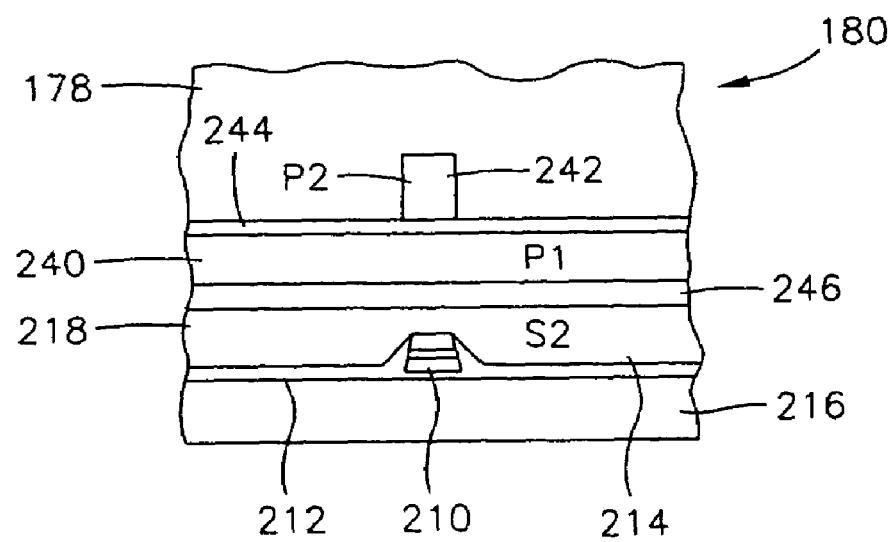
FIG. 15 is a partial ABS view of the exemplary integrated slider taken along plane 15—15 of FIG. 14 to show the integral read and write elements.

FIG. 15 is an ABS view of FIG. 14. A SVT read sensor 210 is sandwiched between a semiconductor layer 216 and the second (S2) shield layer 218, which are elsewhere separated by nonmagnetic nonconductive gap 212 abutting SVT sensor 210. Shield layer 216 is made of relatively soft FM material. In response to external magnetic fields, a sense current $I_S$ (not shown) from SVT read sensor 210 manifests the external field changes as potential changes. These potential changes are then processed as readback signals by processing circuitry 90 (FIG. 11).

Figure 16:
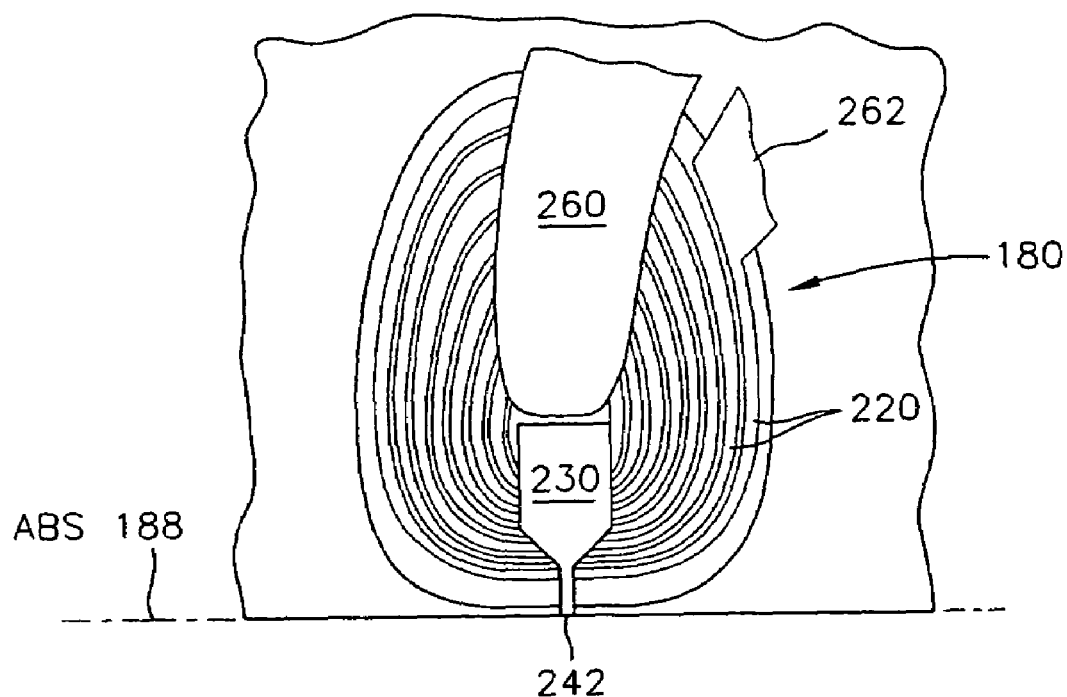
FIG. 16 is a view taken along plane 16—16 of FIG. 14 with all material above the second pole piece removed.

Write head portion 206 of magnetic head 180 includes a coil layer 220 sandwiched between first and second insulation layers 222 and 224. A third insulation layer 226 may be employed for planarizing the head to eliminate ripples in second insulation layer 224 caused by coil layer 220. First, second and third insulation layers 222–226 are referred to in the art as an "insulation stack." Coil layer 220 and first, second and third insulation layers 222, 224 and 226 are sandwiched between the first (P1) and second (P2) pole piece layers 226 and 228, which are magnetically coupled at a back gap (yoke) 230. First (P1) and second (P2) pole piece layers 227 and 228 each have first and second pole tips 240 and 242, which are separated by a write gap layer 244 at the ABS 188. If desired, an insulation layer 246 may be located between second shield (S2) layer 218 and the first pole piece layer 227. Because the second shield layer 218 and the first pole piece layer 227 are separate layers, this head geometry is commonly denominated a "piggyback" read/write head. As shown in FIGS. 10, 12 and 16, the first and second solder connections 248 and 256 connect the appropriate terminals of SVT magnetic sensor 210 to the leads 252 and 254 on suspension 182, and the third and fourth solder connections 250 and 258 connect the leads 260 and 262 from coil 220 (see FIG. 16) to the leads 264 and 266 on suspension 182. A fifth solder connection (not shown) and a fifth lead (not shown) may be provided to accommodate the third terminal (not shown) of SVT magnetic sensor 210.

Figure 17:
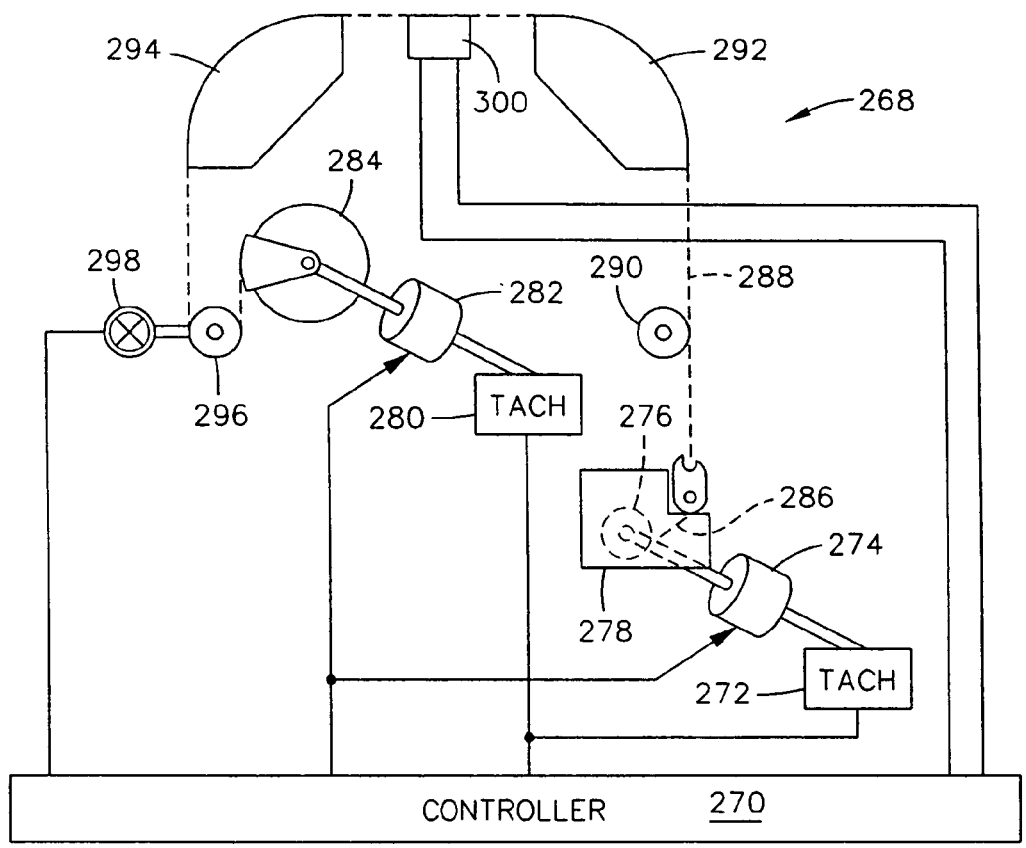
FIG. 17 is a schematic diagram illustrating a magnetic tape drive useful with the integrated interleaved slider assembly of this invention.

FIG. 17 shows a schematic diagram of a magnetic tape drive 268 useful with a read/write slider assembly using the SVT sensor of this invention discussed above in connection with FIGS. 1–8. The controller 270 accepts information from a supply reel tachometer 272, which is coupled to a supply reel motor 274, which is controlled by controller 270 to reversibly rotate a supply reel 276 shown within a single supply reel cartridge 278. A take-up reel tachometer 280 is connected to a take-up reel motor 282 that is reversibly driven by controller 270. Take-up reel motor 282 drives a take-up reel 284. The magnetic tape 286 and its leader block moves along a path shown by the dotted line 288, from supply reel 276 past an idler bearing 290, the air bearing tape guides 292 and 294, continuing around a roller 296 coupled to a tension arm transducer 298 under the control of controller 270, and therefrom to take-up reel 284, substantially as shown. The resulting output from the read elements in the slider assembly 300 is transmitted to controller 270, which also directs data from an external source to slider assembly 300 for transfer onto tape medium 286 through the plurality of write elements in slider assembly 300. Magnetic tape drive 268 may be generally of the one-half inch type having a single reel cartridge. As is well-known in the tape drive industry, other media formats are also available for example, quarter-inch cartridge (QIC), digital linear tape (DLT), digital analog tape (DAT), and the like.

Figure 18:
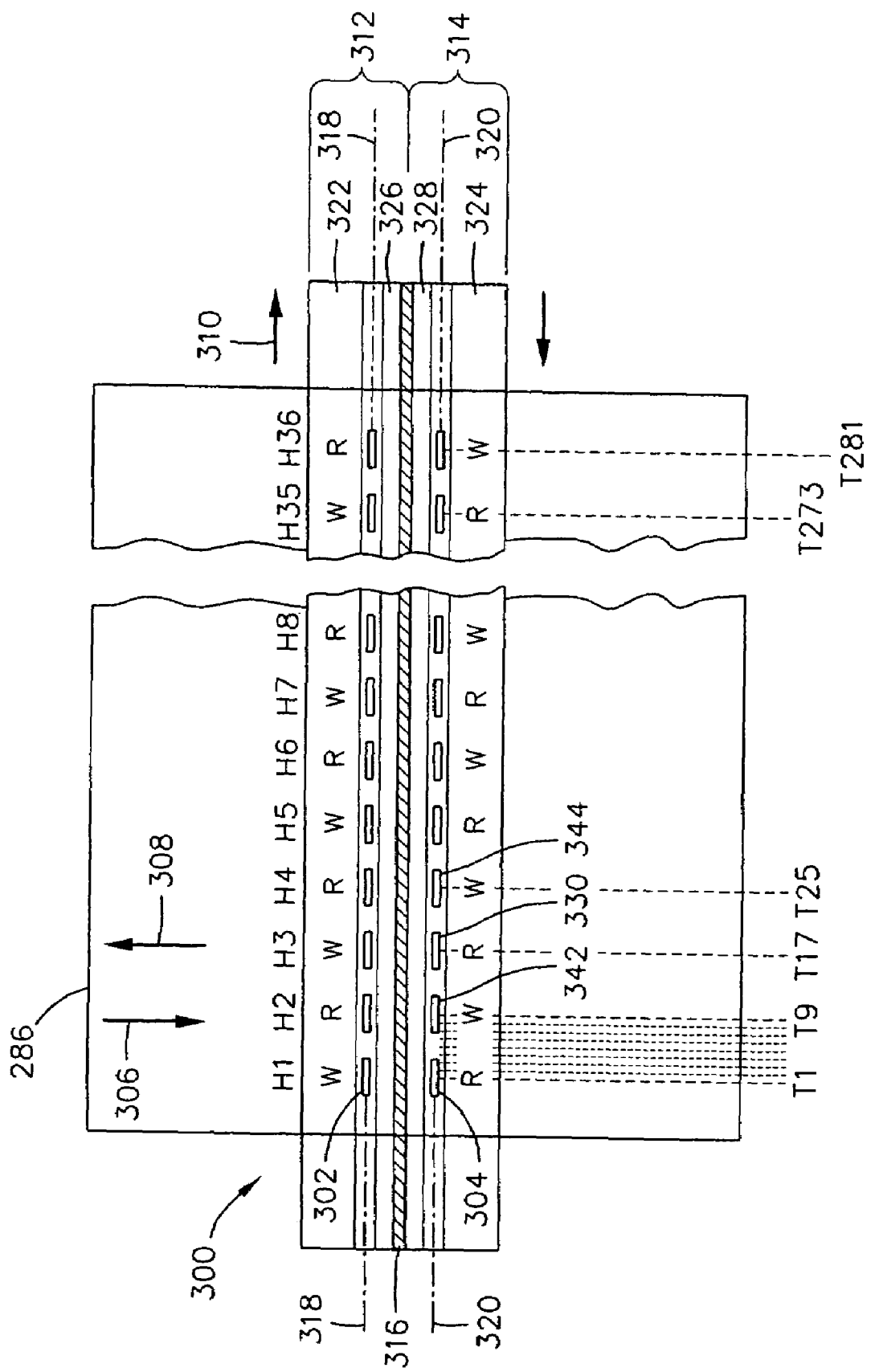
FIG. 18 illustrates a front view of the air bearing surface (ABS) of the exemplary integrated interleaved slider assembly from FIG. 17 in relation to a magnetic tape storage medium.

FIG. 18 shows a plan view of the air bearing surface (ABS) of an exemplary embodiment of slider assembly 300 from FIG. 17, where the read elements are marked "R" and the write elements are marked "W." The write elements, exemplified by the write head 302 and the read elements, exemplified by the read head 304, are disposed in alternating fashion to form a single set of thirty-eight (for example) read/write track-pairs, exemplified by the R/W track-pair 302–304. As used herein, the term "alternating" is intended to include other formats. For example, one format provides that the odd-numbered heads H1, H3, H5 etc. are operative during forward tape movement, while the even-numbered heads H2, H4, H6 etc. are operative during the opposite direction of tape movement.

Generally, the length of magnetic tape medium 286 moves in either a forward or reverse direction as indicated by the arrows 306 and 308. Slider assembly 300 is shown in FIG. 18 as if magnetic tape medium 286 were transparent, although such tape medium normally is not transparent. Arrow 306 designates a forward movement of tape medium 286 and arrow 308 designates a reverse direction. Magnetic tape medium 286 and head assembly 300 operate in a transducing relationship in the manner well-known in the art.

Each of the elements in slider assembly 300 is intended to operate over a plurality of data tracks in magnetic tape medium 286, as may be appreciated with reference to the data tracks T1, T9, T17, etc. in FIG. 18, which shows an exemplary 288-track scheme having a data track density on magnetic tape medium 286 of eight times the recording element density of R/W track-pairs H1, H2, . . . H36 in slider assembly 300. In this example, tracks T9, T25, . . . T281 may be written with one pass of magnetic tape medium 286 in direction 306 over even-numbered R/W track-pairs H2, H4, . . . H36 and then tracks T1, T17, . . . T273 written on a return pass of magnetic tape medium 286 over the odd-numbered R/W track-pairs H1, H3, . . . H35 by moving the lateral position of MR head assembly 300 in the direction of the arrow 310 by a distance equivalent to one track pitch (T1-T2), which is about 12% of the R/W track-pair spacing (H1-H2).

Slider assembly 300 includes the integral thin-film slider modules 312 and 314 of generally identical construction. Slider modules 312 and 314 are joined together with an adhesive layer 316 to form a single physical unit, wherein the R/W track-pairs H1, H2, . . . H36 are aligned as precisely as possible in the direction of tape medium movement. Slider modules 312 and 314 each include a head-gap line 318 and 320, respectively, where the individual R/W gaps, exemplified by write head 302 and read head 304, are precisely located. Each thin-film slider module 312, 314 also includes a separate monolithic slider substrate 322, 324 and a separate closure piece 326, 328, respectively. Monolithic slider substrate 322 is bonded near head-gap line 318 by adhesive to closure piece 326 to form thin-film slider module 312 and monolithic slider substrate 324 is bonded near head-gap line 320 by adhesive to closure piece 328 to form thin-film slider module 314. As precisely as possible, head-gap lines 318, 320 are disposed perpendicular to the directions of tape medium movement as represented by arrows 306, 308. The R/W head-gaps at H1-H36 in thin-film slider module 312 cooperate with the corresponding R/W head-gaps in thin-film slider module 314 to provide read-after-write functionality during movement of magnetic tape medium 286. The read head gaps of one thin-film slider module are precisely aligned with the write head gaps of the other module along the direction of movement of tape medium 286. Thus, for example, write head 302 is aligned with read head 304 to form a single R/W track-pair H1 for read-after-write during magnetic tape movement in the direction indicated by arrow 306.

Figure 19:
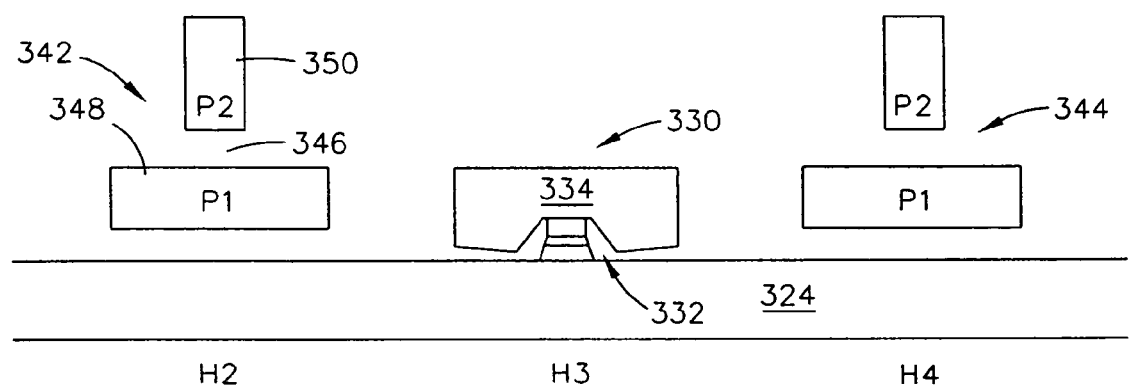
FIG. 19 illustrates a cutaway portion of the slider assembly from FIG. 18 expanded to illustrate the features of the integral interleaved thin-film read and write heads, including an exemplary SVT read sensor of this invention.

FIG. 19 illustrates the detail (not to scale) of a portion of the ABS of monolithic slider substrate 324 from FIG. 18, including portions of three exemplary R/W head gaps on head-gap line 320, which are aligned with track-pairs H2-H4 substantially as shown. The integral thin-film slider elements in FIG. 19 are illustrated to exhibit submicron detail in the usual manner and are not to scale. Considering first the read-head 330 at track-pair H3, a sensor stack 332 is disposed on substrate 324 under a magnetic shield 334. As in FIG. 18, read head 330 is seen to be disposed between the two write heads 342 and 344 positioned for writing data on track-pairs H2, H4, each adjacent to track-pair H3, substantially as shown. Write head 344 is substantially identical to write head 342, which, for example, includes a write-gap 346 defined by two spaced magnetic pole (P1 & P2) tips 348 and 350. Write head 342 may also include a magnetic layer disposed coplanar to magnetic shield 334. Additional magnetic layers above and below write head 342 may be electrically isolated from the magnetic pole piece 348 by means of an intermediate insulating layer or may be in contact therewith and may be deposited using the same material and deposition cycle as magnetic shield 334 to improve manufacturability.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A slider having an air-bearing surface (ABS), the slider comprising:
    a monolithic semiconductor substrate disposed at the ABS;
    an integral spin valve transistor (SVT) having a read width (RW) disposed on the semiconductor substrate at the ABS, including
        a sensor stack having a top surface and including a first ferromagnetic (FM) layer in contact with and forming a Schottky barrier at the monolithic semiconductor substrate;
        a FM shield layer disposed over the sensor stack and in electrical contact with the top surface thereof; and
        a SVT emitter terminal, a SVT collector terminal and a SVT base terminal.

2. The slider of claim 1 further comprising:
    two sensor stack sides defining the RW; and
    an insulating layer disposed between the two sensor stack sides and the FM shield layer.

3. The slider of claim 2 further comprising:
    a conductor disposed to couple the SVT collector terminal to the semiconductor substrate;
    a conductor disposed to couple the SVT base terminal to the first FM layer; and
    a conductor disposed to couple the SVT emitter terminal to the FM shield layer.

4. The slider of claim 3 further comprising:
    in the sensor stack,
        a tunnel valve (TV) stack including a first FM layer in contact with and forming a Schottky barrier at the semiconductor substrate surface.

5. The slider of claim 4 further comprising:
    in the TV stack,
        a second FM layer, and
        a nonmagnetic nonconductive spacer layer between the first FM layer and the second FM layer.

6. The slider of claim 5 further comprising:
    an integral magnetic write head including:
        two FM pole piece layers that have a yoke portion located between a pole tip portion and a back gap portion wherein one pole piece is significantly larger than the other pole piece and the pole piece layers are connected at their back gap portions;
        a nonmagnetic write gap layer located adjacent a pole tip portion;
        an insulation stack with at least one coil layer embedded therein located between the yoke portions of the pole piece layers.

7. The slider of claim 5 further comprising:
    in the first FM layer,
        a FM pinned layer structure, and
        an antiferromagnetic (AFM) pinning layer structure exchange-coupled to the pinned layer structure.

8. The slider of claim 5 further comprising:
    in the second FM layer,
        a FM pinned layer structure, and
        an AFM pinning layer structure exchange-coupled to the pinned layer structure.

9. The slider of claim 3 further comprising:
    in the sensor stack,
        a spin valve (SV) stack including a first FM layer in contact with and forming a Schottky barrier at the semiconductor substrate surface.

10. The slider of claim 9 further comprising:
    in the SV stack
        a second FM layer, and
        a nonmagnetic conductive spacer layer between the first FM layer and the second FM layer.

11. The slider of claim 10 further comprising:
    an integral magnetic write head including:
        two FM pole piece layers that have a yoke portion located between a pole tip portion and a back gap portion wherein one pole piece is significantly larger than the other pole piece and the pole piece layers are connected at their back gap portions;
        a nonmagnetic write gap layer located adjacent a pole tip portion;
        an insulation stack with at least one coil layer embedded therein located between the yoke portions of the pole piece layers.

12. The slider of claim 10 further comprising:
    in the first FM layer,
        a FM pinned layer structure, and
        an AFM pinning layer structure exchange-coupled to the pinned layer structure.

13. The slider of claim 10 further comprising:
    in the second FM layer,
        a FM pinned layer structure, and
        an AFM pinning layer structure exchange-coupled to the pinned layer structure.

14. The slider of claim 3 further comprising:
    a transistor structure in the monolithic semiconductor substrate.

15. The slider of claim 1 further comprising:
    in the sensor stack,
        a FM free layer at the top surface thereof and a FM pinned layer structure in contact with and forming a Schottky barrier at the semiconductor substrate surface.

16. The slider of claim 1 further comprising:
in the sensor stack,
a FM pinned layer structure at the top surface thereof and a FM free layer in contact with and forming a Schottky barrier at the semiconductor substrate surface.

17. The slider of claim 1 wherein the semiconductor substrate comprises silicon.

18. The slider of claim 1 further comprising:
in the sensor stack,
a TV stack including a first FM layer in contact with and forming a Schottky barrier at the semiconductor substrate surface.

19. The slider of claim 1 further comprising:
in the sensor stack,
a SV stack including a first FM layer in contact with and forming a Schottky barrier at the semiconductor substrate surface.

20. The slider of claim 1 further comprising:
conductor disposed to couple the SVT collector terminal to the semiconductor substrate;
a conductor disposed to couple the SVT base terminal to the first FM layer; and a conductor disposed to couple the SVT emitter terminal to the FM shield layer.

21. The slider of claim 1 further comprising:
a transistor structure in the monolithic semiconductor substrate.
two FM pole piece layers that have a yoke portion located between a pole tip portion and a back gap portion wherein one pole piece is significantly larger than the other pole piece and the pole piece layers are connected at their back gap portions;
a nonmagnetic write gap layer located adjacent a pole tip portion;
an insulation stack with at least one coil layer embedded therein located between the yoke portions of the pole piece layers.

22. The slider of claim 1 further comprising:
an integral magnetic write head including:
two FM pole piece layers that have a yoke portion located between a pole tip portion and a back gap portion wherein one pole piece is significantly larger than the other pole piece and the pole piece layers are connected at their back gap portions;
a nonmagnetic write gap layer located adjacent a pole tip portion;
an insulation stack with at least one coil layer embedded therein located between the yoke portions of the pole piece layers.

23. A magnetic data storage drive for storing data on a magnetic medium, the drive comprising:
a housing;
a slider including a monolithic semiconductor substrate disposed at an air-bearing surface (ABS), comprising:
an integral magnetic write head including:
two ferromagnetic (FM) pole piece layers that have a yoke portion located between a pole tip portion and a back gap portion wherein one pole piece is significantly larger than the other pole piece and the pole piece layers are connected at their back gap portions;
a nonmagnetic write gap layer located adjacent a pole tip portion;
an insulation stack with at least one coil layer embedded therein located between the yoke portions of the pole piece layers; and
an integral read head including:
a spin valve transistor (SVT) having a read width (RW) disposed on the semiconductor substrate at the air-bearing surface (ABS), including
a sensor stack having a top surface and including a first FM layer in contact with and forming a Schottky barrier at the monolithic semiconductor substrate,
a FM shield layer disposed over the sensor stack and in electrical contact with the top surface thereof, and
a SVT emitter terminal, a SVT collector terminal and a SVT base terminal;
a support fixed to the housing for supporting the slider;
medium moving means fixed to the housing for moving the magnetic medium past the slider in a transducing relationship with the integral magnetic head;
positioning means coupled to the support for moving the slider to a plurality of positions with respect to the moving magnetic medium; and
control means coupled to the magnetic head, the medium moving means and the positioning means for controlling and processing signals with respect to the magnetic head, controlling movement of the magnetic medium and controlling the position of the slider.

24. The magnetic data storage drive of claim 23 further comprising:
in the SVT,
two sensor stack sides defining the RW, and
an insulating layer disposed between the two sensor stack sides and the FM shield layer.

25. The magnetic data storage drive of claim 24 further comprising:
in the read head,
a conductor disposed to couple the SVT collector terminal to the semiconductor substrate;
a conductor disposed to couple the SVT base terminal to the first FM layer; and
a conductor disposed to couple the SVT emitter terminal to the FM shield layer.

26. The magnetic data storage drive of claim 25 further comprising:
in the read head,
a tunnel valve (TV) stack including a first FM layer in contact with and forming a Schottky barrier at the semiconductor substrate.

27. The magnetic data storage drive of claim 26 further comprising:
in the TV stack,
a second FM layer, and
a nonmagnetic nonconductive spacer layer between the first FM layer and the second FM layer.

28. The magnetic data storage drive of claim 27 further comprising:
in the first FM layer,
a FM pinned layer structure, and
an antiferromagnetic (AFM) pinning layer structure exchange-coupled to the pinned layer structure.

29. The magnetic data storage drive of claim 27 further comprising:
in the second FM layer,
a FM pinned layer structure, and
an AFM pinning layer structure exchange-coupled to the pinned layer structure.

30. The magnetic data storage drive of claim 25 further comprising:
in the read head,
a spin valve (SV) stack including a first FM layer in contact with and forming a Schottky barrier at the semiconductor substrate surface.

31. The magnetic data storage drive of claim 30 further comprising:
in the SV stack,
a second FM layer, and
a nonmagnetic conductive spacer layer between the first FM layer and the second FM layer.

32. The magnetic data storage drive of claim 31 further comprising:
in the first FM layer,
a FM pinned layer structure, and
an AFM pinning layer structure exchange-coupled to the pinned layer structure.

33. The magnetic data storage drive of claim 31 further comprising:
in the second FM layer,
a FM pinned layer structure, and
an AFM pinning layer structure exchange-coupled to the pinned layer structure.

34. The magnetic data storage drive of claim 25 further comprising:
a transistor structure in the monolithic semiconductor substrate.

35. The magnetic data storage drive of claim 23 further comprising:
in the sensor stack,
a FM free layer at the top surface thereof and a FM pinned layer structure in contact with and forming a Schottky barrier at the semiconductor substrate surface.

36. The magnetic data storage drive of claim 23 further comprising:
in the sensor stack,
a FM pinned layer structure at the top surface thereof and a FM free layer in contact with and forming a Schottky barrier at the semiconductor substrate surface.

37. The magnetic data storage drive of claim 23 wherein the semiconductor substrate comprises silicon.

38. The magnetic data storage drive of claim 23 further comprising:
in the read head,
a TV stack including a first FM layer in contact with and forming a Schottky barrier at the semiconductor substrate surface.

39. The magnetic data storage drive of claim 23 further comprising:
in the read head,
a SV stack including a first FM layer in contact with and forming a Schottky barrier at the semiconductor substrate surface.

40. The magnetic data storage drive of claim 23 further comprising:
in the read head,
a conductor disposed to couple the SVT collector terminal to the semiconductor substrate;
a conductor disposed to couple the SVT base terminal to the first FM layer; and
a conductor disposed to couple the SVT emitter terminal to the FM shield layer.

41. The magnetic data storage drive of claim 23 further comprising:
a transistor structure in the monolithic semiconductor substrate.

42. The magnetic data storage drive of claim 23 wherein: the moving magnetic medium includes a rotating magnetic disk.

43. The magnetic data storage drive of claim 23 wherein: the moving magnetic medium includes a streaming magnetic tape.

* * * * *